US012657763B2

(12) United States Patent
Lee et al.

(10) Patent No.: US 12,657,763 B2
(45) Date of Patent: Jun. 16, 2026

(54) AGGREGATING FEATURES FROM MULTIPLE IMAGES TO GENERATE HISTORICAL DATA FOR A CAMERA

(71) Applicant: Microsoft Technology Licensing, LLC, Redmond, WA (US)

(72) Inventors: Paul Lee, Redmond, WA (US); Michael Bleyer, Seattle, WA (US); Christian Markus Maekelae, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 632 days.

(21) Appl. No.: 17/978,526

(22) Filed: Nov. 1, 2022

(65) Prior Publication Data

US 2024/0144526 A1    May 2, 2024

(51) Int. Cl.
G06T 7/73 (2017.01)
G06T 7/246 (2017.01)
G06T 19/00 (2011.01)

(52) U.S. Cl.
CPC .............. G06T 7/74 (2017.01); G06T 7/251 (2017.01); G06T 19/006 (2013.01)

(58) Field of Classification Search
None
See application file for complete search history.

(56) References Cited

U.S. PATENT DOCUMENTS 11,049,277 B1 * 6/2021 Price .................... H04N 13/128
2019/0043203 A1 * 2/2019 Fleishman ............. G06V 10/82

2020/0198149 A1 * 6/2020 Jiang ...................... B25J 13/089
2022/0164988 A1 5/2022 Dotsenko
2023/0031023 A1 2/2023 Wang
2023/0059657 A1 2/2023 Hu
(Continued)

FOREIGN PATENT DOCUMENTS

EP          2491532 B1     6/2022

OTHER PUBLICATIONS

Sun et al., "Deep Video Matting via Spatio-Temporal Alignment and Aggregation," Proceedings of the IEEE/CVF Conference on Computer Vision and Pattern Recognition (CVPR), pp. 6975-6984 (Year: 2021).*

(Continued)

*Primary Examiner* — Bernard Krasnic
(74) *Attorney, Agent, or Firm* — Workman Nydegger

(57) ABSTRACT

Techniques for generating an aggregated set of features from multiple images generated by a camera are disclosed. A first image generated by the camera is accessed, where the first image was generated at a first time. A first set of features are identified from within the first image. A second image generated by the camera is accessed, where the second image is generated at a subsequent, second time. A second set of features are identified from within the second image. Movement data is obtained. This movement data details a movement of the camera between the first and second times. The movement data is used to reproject a pose embodied in the first image to correspond to a pose embodied in the second image. The embodiments aggregate the two sets of features to generate the aggregated set of features. The aggregated set of features for the camera are then cached.

19 Claims, 19 Drawing Sheets

(56)                    References Cited

U.S. PATENT DOCUMENTS

| | | |
|---|---|---|
| 2023/0316607 A1 | 10/2023 | He |
| 2024/0144496 A1 | 5/2024 | Lee |

OTHER PUBLICATIONS

Badino et al., "Visual Odometry by Multi-frame Feature Integration," 2013 IEEE International Conference on Computer Vision Workshops, pp. 222-229 (Year: 2013).*

Yang, B.—"Robust Attentional Aggregation of Deep Feature Sets for Multi-view 3D Reconstruction"—International Journal of Computer Vision 2020—pp. 53-73 (Year: 2020).*

Badino, et al., "Visual odometry by multi-frame feature integration", Proceedings of the IEEE International Conference on Computer Vision Workshops, 2013, pp. 222-229.

Chen, et al., "Coherent online video style transfer", In Proceedings of the IEEE International Conference on Computer Vision, 2017, pp. 1105-1114.

International Search Report and Written Opinion received for PCT Application No. PCT/US2023/033646, (MS #412302-PCT01) Feb. 20, 2024, 11 pages.

International Search Report and Written Opinion received for PCT Application No. PCT/US23/033652, (MS#412413-PCT01), Feb. 8, 2024, 15 pages.

Jie Zhou et al: "Video Stabilization and Completion Using Two Cameras", IEEE Transactions on Circuits and Systems for Video Technology, IEEE, USA, vol. 21, issue No. 12, Dec. 1, 2011, pp. 1879-1889.

Notice of Allowance mailed on Mar. 10, 2025, in U.S. Appl. No. 17/978,463 (MS# 412302-US01), 12 pages.

Notice of Allowance mailed on Jun. 3, 2025, in U.S. Appl. No. 17/978,463, (MS#412302-US01) 13 pages.

Supplemental Notice of Allowability mailed on Jun. 26, 2025, in U.S. Appl. No. 17/978,463 (MS# 412302-US01), 09 pages.

International Preliminary Report on Patentability received for PCT Application No. PCT/US2023/033646, (MS# 412302-PCT01) May 15, 2025, 07 pages.

International Preliminary Report on Patentability received for PCT Application No. PCT/US2023/033652, (MS# 412413-PCT01) May 15, 2025, 9 pages.

U.S. Appl. No. 17/978,463, filed Nov. 1, 2022.

* cited by examiner

First Camera
500

Target
510

Second Camera FOV
520

First Camera FOV
515

Second Camera
505

Resolution 605

Refresh Rate 610

IMU 615

First Camera FOV 600

Second Camera FOV
700

Resolution
705

Refresh Rate
710

IMU
715

Cache
1220

History Of
Features
1215

Features
1200

Features
1205

Features
1210

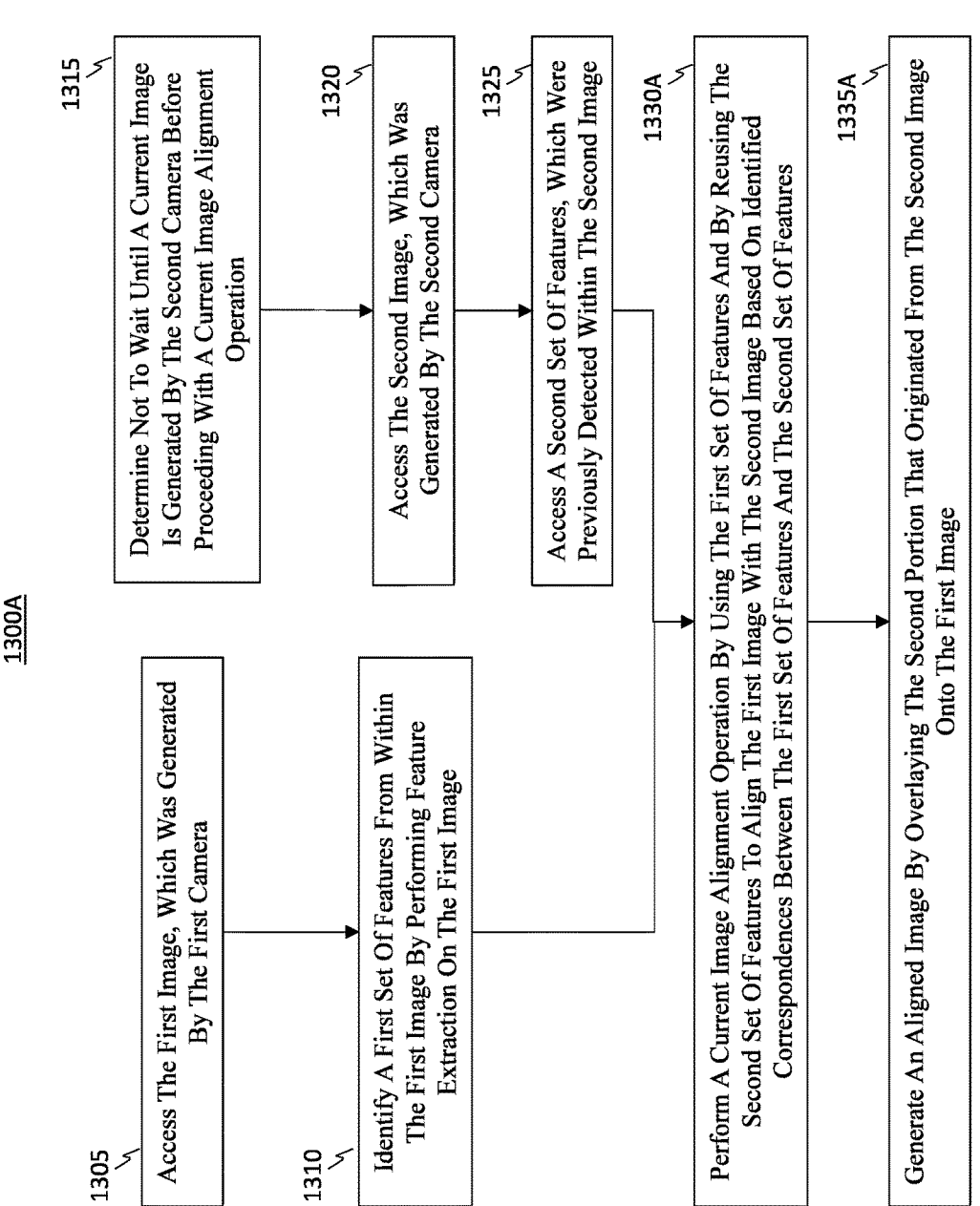

1300A

1305 — Access The First Image, Which Was Generated By The First Camera

1310 — Identify A First Set Of Features From Within The First Image By Performing Feature Extraction On The First Image 1315 — Determine Not To Wait Until A Current Image Is Generated By The Second Camera Before Proceeding With A Current Image Alignment Operation 1320 — Access The Second Image, Which Was Generated By The Second Camera 1325 — Access A Second Set Of Features, Which Were Previously Detected Within The Second Image 1330A — Perform A Current Image Alignment Operation By Using The First Set Of Features And By Reusing The Second Set Of Features To Align The First Image With The Second Image Based On Identified Correspondences Between The First Set Of Features And The Second Set Of Features 1335A — Generate An Aligned Image By Overlaying The Second Portion That Originated From The Second Image Onto The First Image

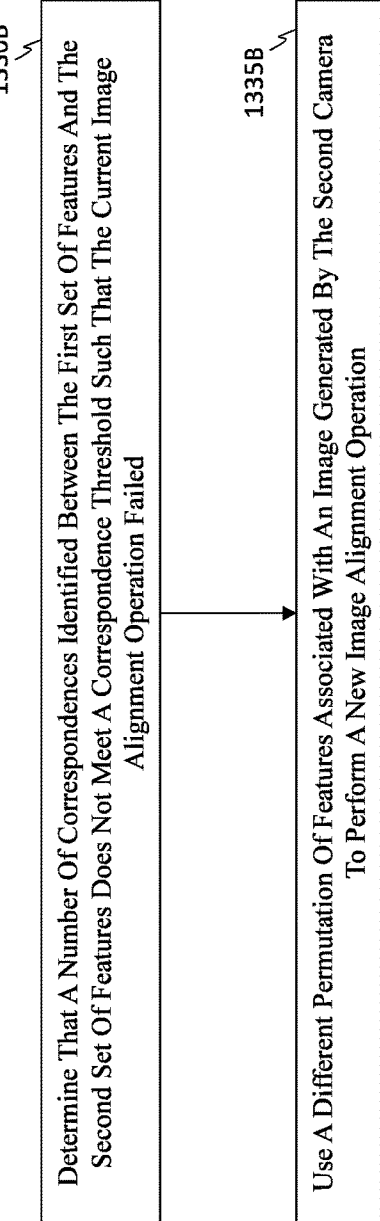

1330B

Determine That A Number Of Correspondences Identified Between The First Set Of Features And The Second Set Of Features Does Not Meet A Correspondence Threshold Such That The Current Image Alignment Operation Failed

1335B

Use A Different Permutation Of Features Associated With An Image Generated By The Second Camera To Perform A New Image Alignment Operation

*Figure 13B*

1300C
Thread 2
1360 — Access A Third Image
1365 — Identify A Third Set Of Features From The Third Image
1370 — Access A Fourth Set Of Features From A Fourth Image
1375 — Perform Image Alignment
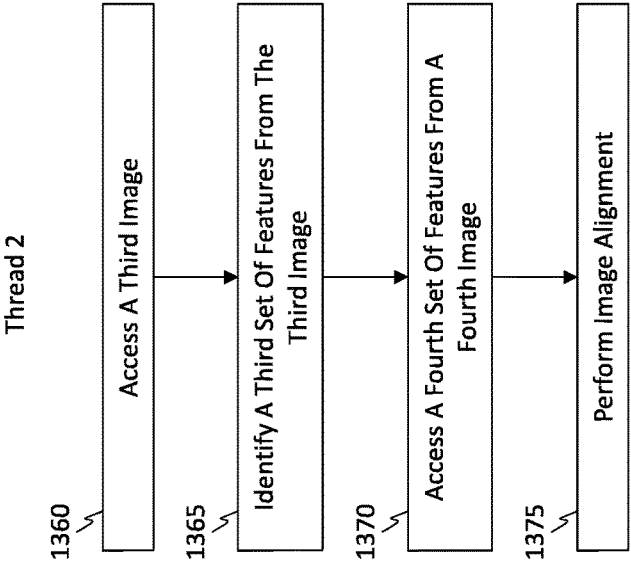
Thread 1
1340 — Access A First Image
1345 — Identify A First Set Of Features From The First Image
1350 — Access A Second Set Of Features From A Second Image
1355 — Perform Image Alignment
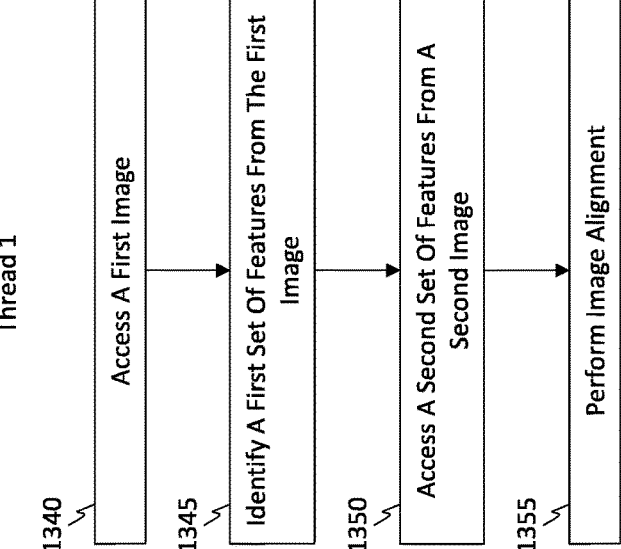
*Figure 13C*

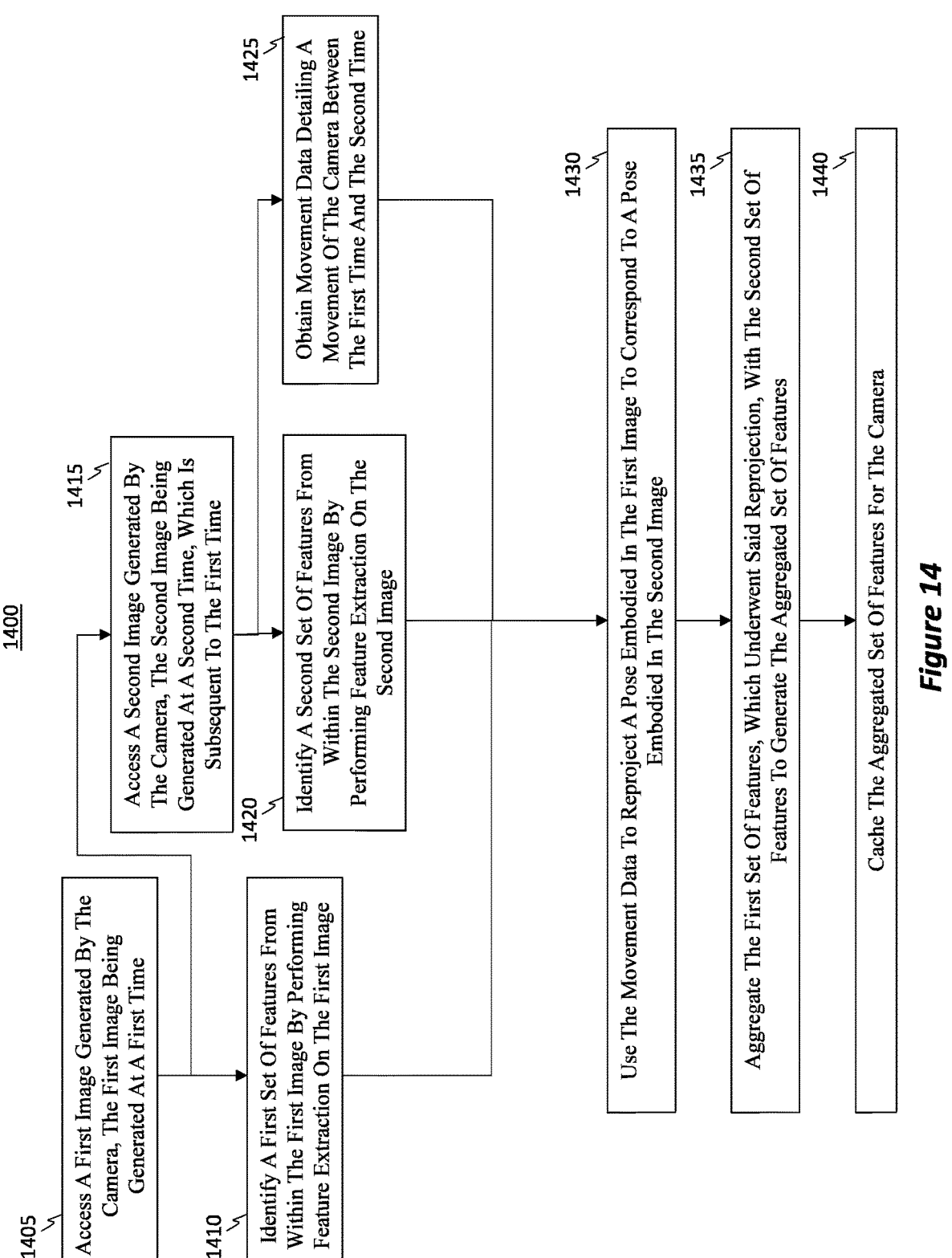

1400

1405 Access A First Image Generated By The Camera, The First Image Being Generated At A First Time 1410 Identify A First Set Of Features From Within The First Image By Performing Feature Extraction On The First Image 1415 Access A Second Image Generated By The Camera, The Second Image Being Generated At A Second Time, Which Is Subsequent To The First Time 1420 Identify A Second Set Of Features From Within The Second Image By Performing Feature Extraction On The Second Image 1425 Obtain Movement Data Detailing A Movement Of The Camera Between The First Time And The Second Time 1430 Use The Movement Data To Reproject A Pose Embodied In The First Image To Correspond To A Pose Embodied In The Second Image 1435 Aggregate The First Set Of Features, Which Underwent Said Reprojection, With The Second Set Of Features To Generate The Aggregated Set Of Features 1440 Cache The Aggregated Set Of Features For The Camera

*Figure 14*

AGGREGATING FEATURES FROM MULTIPLE IMAGES TO GENERATE HISTORICAL DATA FOR A CAMERA

BACKGROUND

Mixed-reality (MR) systems, which include virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

An MR system may also employ different types of cameras to display content to users, such as in the form of a passthrough image. A passthrough image or view can aid users in avoiding disorientation and/or safety hazards when transitioning into and/or navigating within an MR environment. An MR system can also provide augmented data to enhance a user's view of the real-world. An MR system can present views captured by cameras in a variety of ways. The process of using images captured by world-facing cameras to provide views of a real-world environment creates many challenges, however.

Some of these challenges occur when attempting to align image content from multiple cameras, such as an integrated "system camera" and a detached "external camera" when generating an overlaid image that will be displayed to a user. Challenges also occur when additional visualizations are provided in the resulting overlaid image, where these visualizations are designed to indicate a spatial relationship between the system camera and the external camera. Challenges can also occur if an image has an insufficient number of detectable or extractable features. Accordingly, aligning image content provides substantial benefits, especially in terms of hologram placement and generation, so these problems present serious obstacles to the technical field. As such, there is a substantial need in the field to improve how images are aligned with one another.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Some embodiments generate an aggregated set of features from multiple images generated by a camera. To do so, the embodiments access a first image generated by the camera, where the first image was generated at a first time. The embodiments identify a first set of features from within the first image by performing feature extraction on the first image. The embodiments also access a second image generated by the camera, where the second image is generated at a second time, which is subsequent to the first time. A second set of features are identified from within the second image by performing feature extraction on the second image. Movement data is obtained. This movement data details a movement of the camera between the first time and the second time. The embodiments use the movement data to reproject a pose embodied in the first image to correspond to a pose embodied in the second image. The embodiments aggregate the first set of features, which underwent the reprojection, with the second set of features to generate the aggregated set of features. The aggregated set of features for the camera are then cached.

Some embodiments access the aggregated set of features for the camera during an image alignment operation. With this image alignment operation, an image generated by the camera is aligned with a different image generated by a different camera.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 13A, 13B, and 13C illustrate flowcharts of example methods for performing staggered feature extraction using single threads and/or multiple threads.

FIG. 14 illustrates a flowchart of an example method for aggregating multiple different permutations of extracted features.

DETAILED DESCRIPTION

Embodiments disclosed herein relate to systems, devices (e.g., hardware storage devices, wearable HMDs, etc.) and methods for generating an aggregated set of features from multiple images generated by a camera.

A first image generated by the camera is accessed, where the first image was generated at a first time. A first set of features are identified from within the first image. A second image generated by the camera is accessed, where the second image is generated at a subsequent, second time. A second set of features are identified from within the second image. Movement data is obtained. This movement data details a movement of the camera between the first and second times. The movement data is used to reproject a pose embodied in the first image to correspond to a pose embodied in the second image. The embodiments aggregate the two sets of features to generate the aggregated set of features. The aggregated set of features for the camera are then cached.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

As described earlier, challenges occur when aligning image content from two different cameras. The disclosed embodiments address these challenges and provide solutions to those challenges. Beneficially, the embodiments provide techniques that, when practiced, result in improved success with regard to aligning image content and performing feature matching. As a result of performing these operations, the user's experience is significantly improved, thereby leading to an improvement in the technology. Improved image alignment and visualization are also achieved.

Additional benefits include the ability to potentially increase the frame rate analysis of the system. In some cases, the frame rate can actually be doubled. On the other hand, by keeping the frame rate lower, the embodiments can significantly reduce power usage and processor utilization because fewer frames are being processed. As a result, the efficiency of the computer system itself can be improved and/or the power expenditure of the system can be optimized. Accordingly, these and numerous other benefits will be described throughout the remaining portions of this disclosure.

Example MR Systems and HMDs

Figure 1:
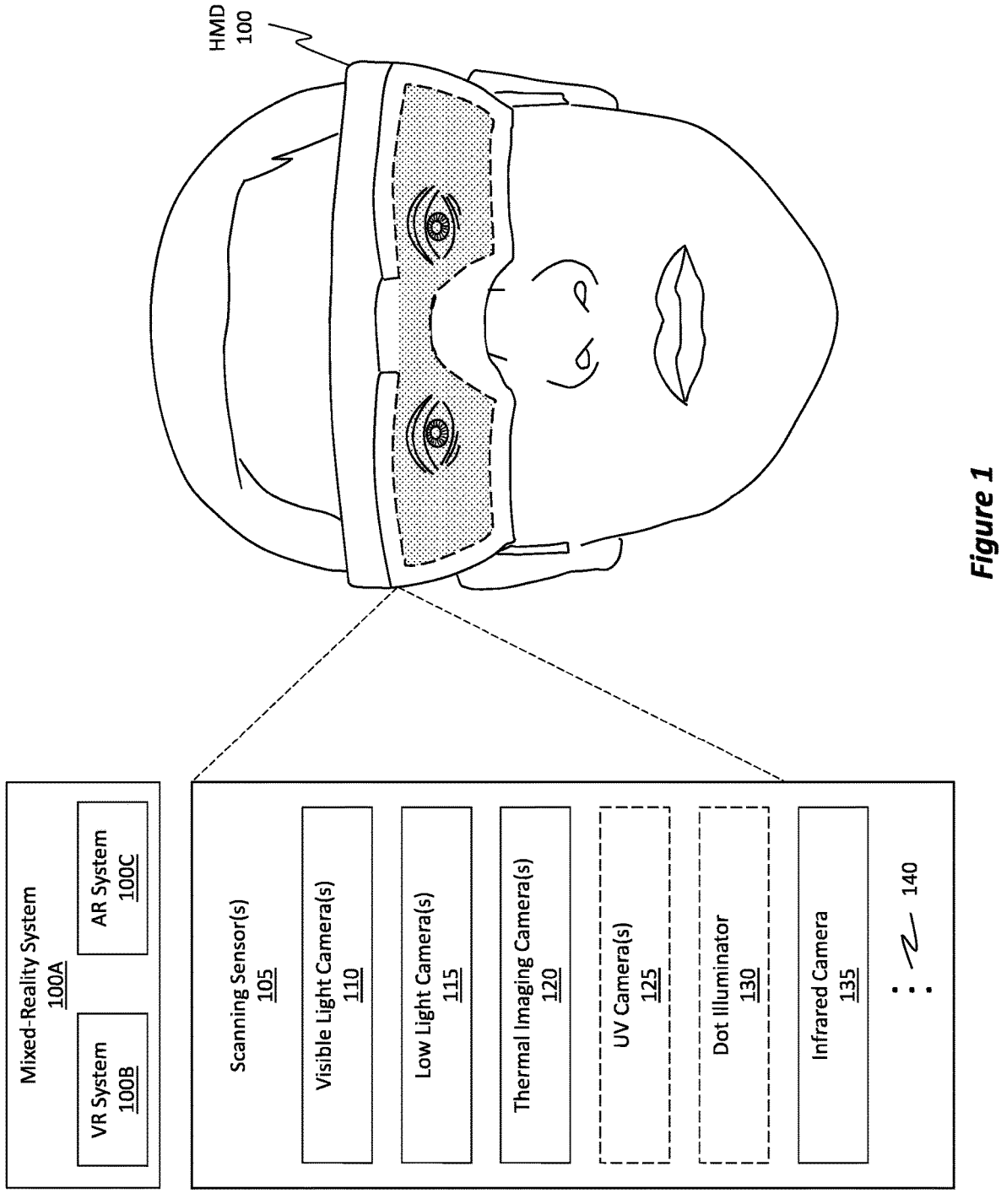
FIG. 1 illustrates an example head mounted device (HMD) configured to perform the disclosed operations.

Attention will now be directed to FIG. 1, which illustrates an example of a head mounted device (HMD) 100. HMD 100 can be any type of MR system 100A, including a VR system 100B or an AR system 100C. It should be noted that while a substantial portion of this disclosure is focused on the use of an HMD, the embodiments are not limited to being practiced using only an HMD. That is, any type of camera system can be used, even camera systems entirely removed or separate from an HMD. As such, the disclosed principles should be interpreted broadly to encompass any type of camera use scenario. Some embodiments may even refrain from actively using a camera themselves and may simply use the data generated by a camera. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment (e.g., by generating a 3D representation of the environment or by generating a "passthrough" visualization). Scanning sensor(s) 105 may comprise any number or any type of scanning devices, without limit.

In accordance with the disclosed embodiments, the HMD 100 may be used to generate a passthrough visualizations of the user's environment. As used herein, a "passthrough" visualization refers to a visualization that reflects the perspective of the environment from the user's point of view. To generate this passthrough visualization, the HMD 100 may use its scanning sensor(s) 105 to scan, map, or otherwise record its surrounding environment, including any objects in the environment, and to pass that data on to the user to view. As will be described shortly, various transformations may be applied to the images prior to displaying them to the user to ensure the displayed perspective matches the user's expected perspective.

To generate a passthrough image, the scanning sensor(s) 105 typically rely on its cameras (e.g., head tracking cameras, hand tracking cameras, depth cameras, or any other type of camera) to obtain one or more raw images (aka "texture images") of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections, if needed.

From the passthrough visualizations, a user will be able to perceive what is currently in his/her environment without having to remove or reposition the HMD 100. Furthermore, as will be described in more detail later, the disclosed passthrough visualizations can also enhance the user's ability to view objects within his/her environment (e.g., by displaying additional environmental conditions that may not have been detectable by a human eye). As used herein, a so-called "overlaid image" can be a type of passthrough image.

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 105 include visible light camera(s) 110, low light camera(s) 115, thermal imaging camera(s) 120, potentially (though not necessarily, as represented by the dotted box in FIG. 1) ultraviolet (UV) camera(s) 125, potentially (though not necessarily, as represented by the dotted box) a dot illuminator 130, and even an infrared camera 135. The ellipsis 140 demonstrates how any other type of camera or camera system (e.g., depth cameras, time of flight cameras, virtual cameras, depth lasers, etc.) may be included among the scanning sensor(s) 105.

As an example, a camera structured to detect mid-infrared wavelengths may be included within the scanning sensor(s) 105. As another example, any number of virtual cameras that are reprojected from an actual camera may be included among the scanning sensor(s) 105 and may be used to generate a stereo pair of images. In this manner, the scanning sensor(s) 105 may be used to generate the stereo pair of images. In some cases, the stereo pair of images may be obtained or generated as a result of performing any one or more of the following operations: active stereo image generation via use of two cameras and one dot illuminator (e.g., dot illuminator 130); passive stereo image generation via use of two cameras; image generation using structured light via use of one actual camera, one virtual camera, and one dot illuminator (e.g., dot illuminator 130); or image generation using a time of flight (TOF) sensor in which a baseline is present between a depth laser and a corresponding camera and in which a field of view (FOV) of the corresponding camera is offset relative to a field of illumination of the depth laser.

The visible light camera(s) 110 are typically stereoscopic cameras, meaning that the fields of view of the two or more visible light cameras at least partially overlap with one another. With this overlapping region, images generated by the visible light camera(s) 110 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 110 can be used to not only generate passthrough visualizations, but they can also be used to determine object depth. In some embodiments, the visible light camera(s) 110 can capture both visible light and IR light.

It should be noted that any number of cameras may be provided on the HMD 100 for each of the different camera types (aka modalities). That is, the visible light camera(s) 110 may include 1, 2, 3, 4, 5, 6, 7, 8, 9, 10, or more than 10 cameras. Often, however, the number of cameras is at least 2 so the HMD 100 can perform passthrough image generation and/or stereoscopic depth matching, as described earlier. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras.

Figure 2:
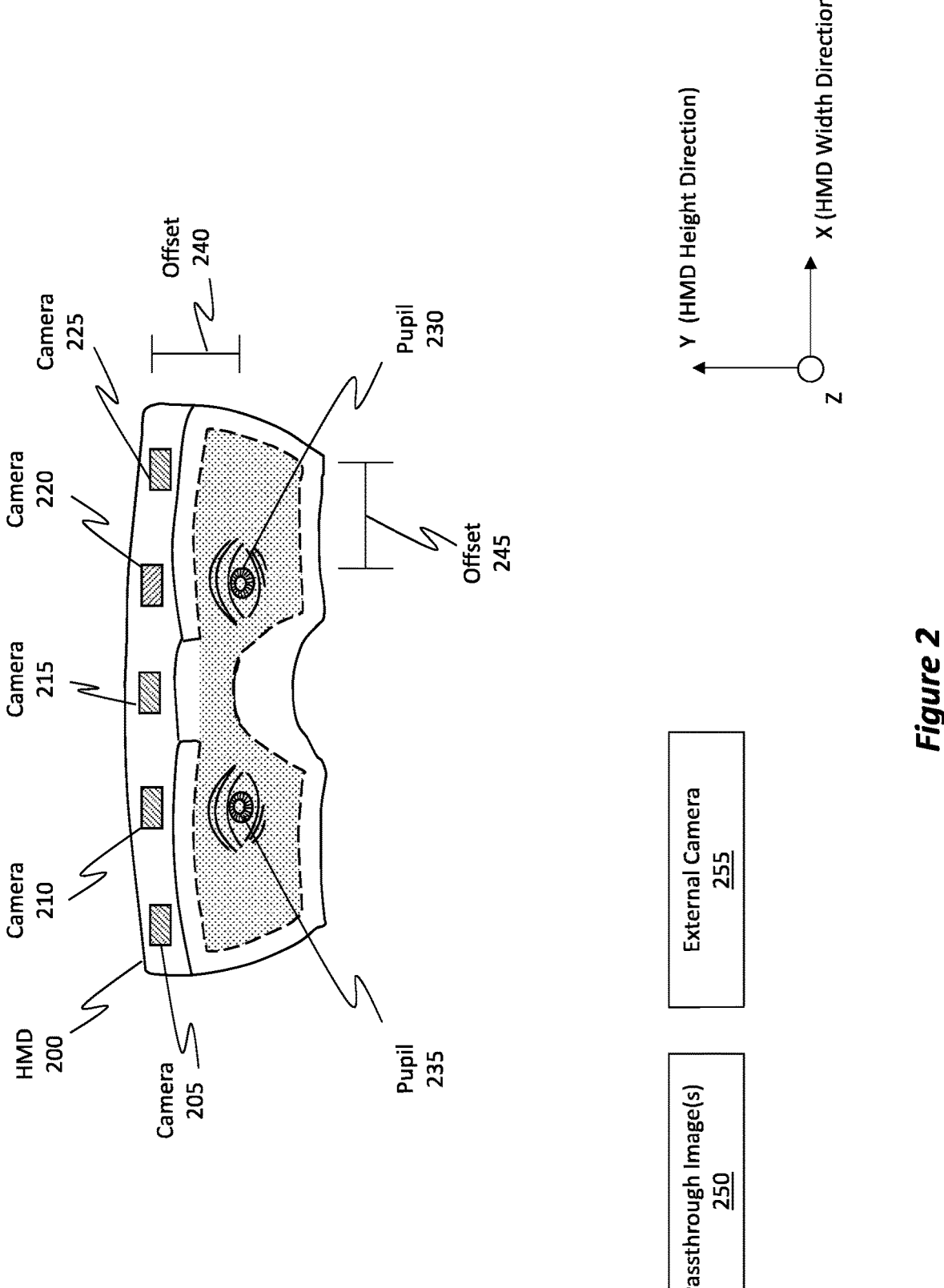
FIG. 2 illustrates another configuration of an HMD.

FIG. 2 illustrates an example HMD 200, which is representative of the HMD 100 from FIG. 1. HMD 200 is shown as including multiple different cameras, including cameras 205, 210, 215, 220, and 225. Cameras 205-225 are representative of any number or combination of the visible light camera(s) 110, the low light camera(s) 115, the thermal imaging camera(s) 120, and the UV camera(s) 125 from FIG. 1. While only 5 cameras are illustrated in FIG. 2, HMD 200 may include more or less than 5 cameras. Any one of those cameras can be referred to as a "system camera."

In some cases, the cameras can be located at specific positions on the HMD 200. In some cases, a first camera (e.g., perhaps camera 220) is disposed on the HMD 200 at a position above a designated left eye position of a user who wears the HMD 200 relative to a height direction of the HMD. For example, the camera 220 is positioned above the pupil 230. As another example, the first camera (e.g., camera 220) is additionally positioned above the designated left eye position relative to a width direction of the HMD. That is, the camera 220 is positioned not only above the pupil 230 but also in-line relative to the pupil 230. When a VR system is used, a camera may be placed directly in front of the designated left eye position. With reference to FIG. 2, a camera may be physically disposed on the HMD 200 at a position in front of the pupil 230 in the z-axis direction.

When a second camera is provided (e.g., perhaps camera 210), the second camera may be disposed on the HMD 200 at a position above a designated right eye position of a user who wears the HMD relative to the height direction of the HMD. For example, the camera 210 is above the pupil 235. In some cases, the second camera is additionally positioned above the designated right eye position relative to the width direction of the HMD. When a VR system is used, a camera may be placed directly in front of the designated right eye position. With reference to FIG. 2, a camera may be physically disposed on the HMD 200 at a position in front of the pupil 235 in the z-axis direction.

When a user wears HMD 200, HMD 200 fits over the user's head and the HMD 200's display is positioned in front of the user's pupils, such as pupil 230 and pupil 235. Often, the cameras 205-225 will be physically offset some distance from the user's pupils 230 and 235. For instance, there may be a vertical offset in the HMD height direction (i.e. the "Y" axis), as shown by offset 240. Similarly, there may be a horizontal offset in the HMD width direction (i.e. the "X" axis), as shown by offset 245.

HMD 200 is configured to provide passthrough image(s) 250 for the user of HMD 200 to view. In doing so, HMD 200 is able to provide a visualization of the real world without requiring the user to remove or reposition HMD 200. These passthrough image(s) 250 effectively represent the view of the environment from the HMD's perspective. Cameras 205-225 are used to provide these passthrough image(s) 250. The offset (e.g., offset 240 and 245) between the cameras and the user's pupils results in parallax. In order to provide these passthrough image(s) 250, the embodiments can perform parallax correction by applying various transformations and reprojections on the images in order to change the initial perspective represented by an image into a perspective matches that of the user's pupils. Parallax correction relies on the use of a depth map in order to make the reprojections.

In some implementations, the embodiments utilize a planar reprojection process to correct parallax when generating the passthrough images as opposed to performing a full three-dimensional reprojection. Using this planar reprojection process is acceptable when objects in the environment are sufficiently far away from the HMD. Thus, in some cases, the embodiments are able to refrain from performing three-dimensional parallax correction because the objects in the environment are sufficiently far away and because that distance results in a negligible error with regard to depth visualizations or parallax issues.

Any of the cameras 205-225 constitute what is referred to as a "system camera" (aka first camera) because they are integrated parts of the HMD 200. In contrast, the external camera 255 (aka second camera) is physically separate and detached from the HMD 200 but can communicate wirelessly with the HMD 200. That is, the external camera 255 is a peripheral camera relative to the HMD 200. As will be described shortly, it is desirable to align images (or image content) generated by the external camera 255 with images (or image content) generated by a system camera to then generate an overlaid image, which can operate as a pass-through image.

Often, the angular resolution of the external camera 255 is higher (i.e. more pixels per degree and not just more pixels) than the angular resolution of the system camera, so the resulting overlaid image provides enhanced image content beyond that which is available from using only the system camera image. Additionally, or alternatively, the modalities of the external camera 255 and the system camera may be different, so the resulting overlaid image can also include enhanced information. As an example, suppose the external camera 255 is a thermal imaging camera. The resulting overlaid image can, therefore, include visible light image content and thermal image content.

Accordingly, providing an overlaid passthrough image is highly desirable. It should be noted that the external camera 255 may be any of the camera types listed earlier. Additionally, there may be any number of external cameras, without limit.

Example Scenarios

Figure 3:
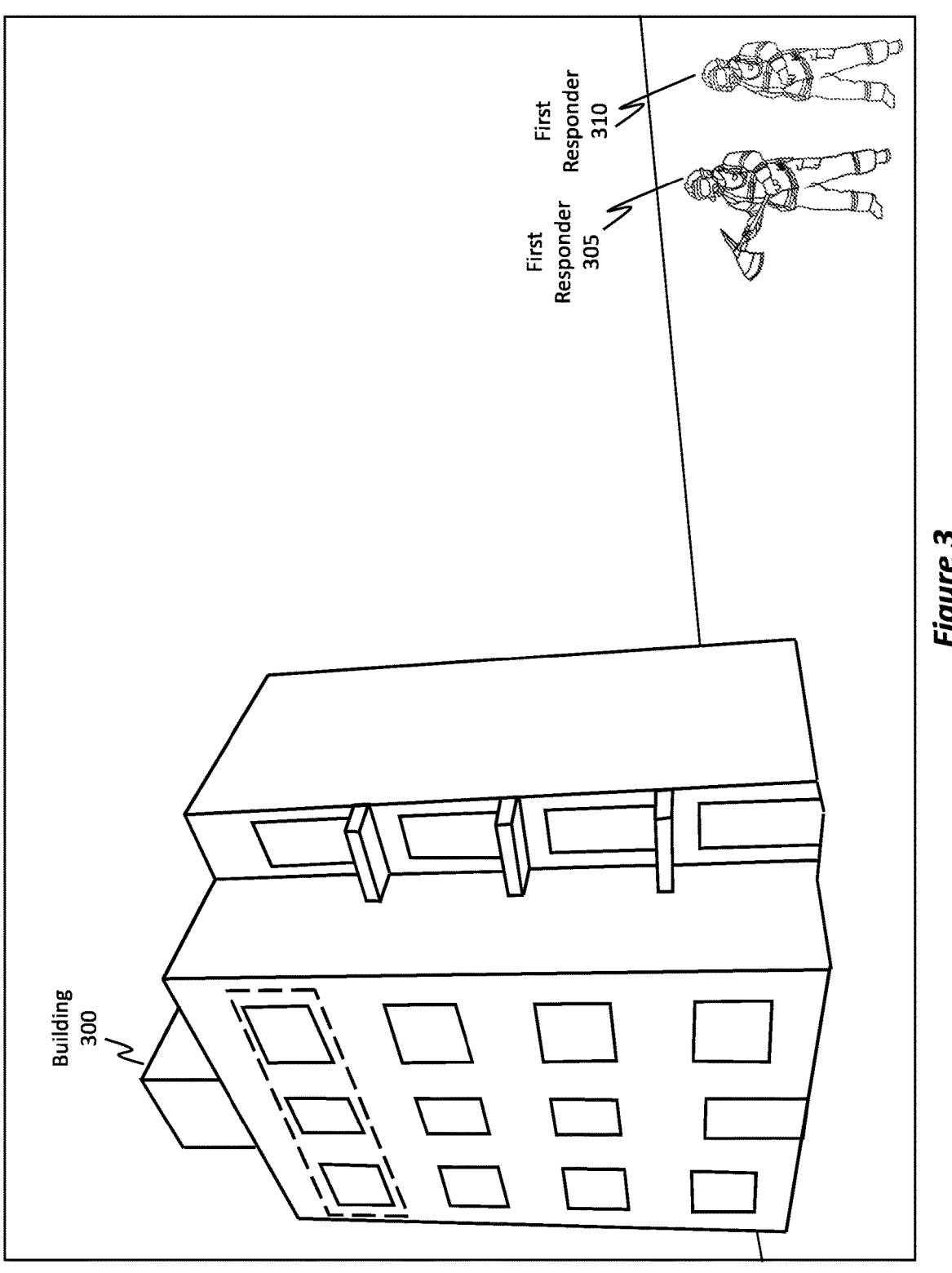
FIG. 3 illustrates an example scenario in which the disclosed principles may be practiced.
Figure 4:
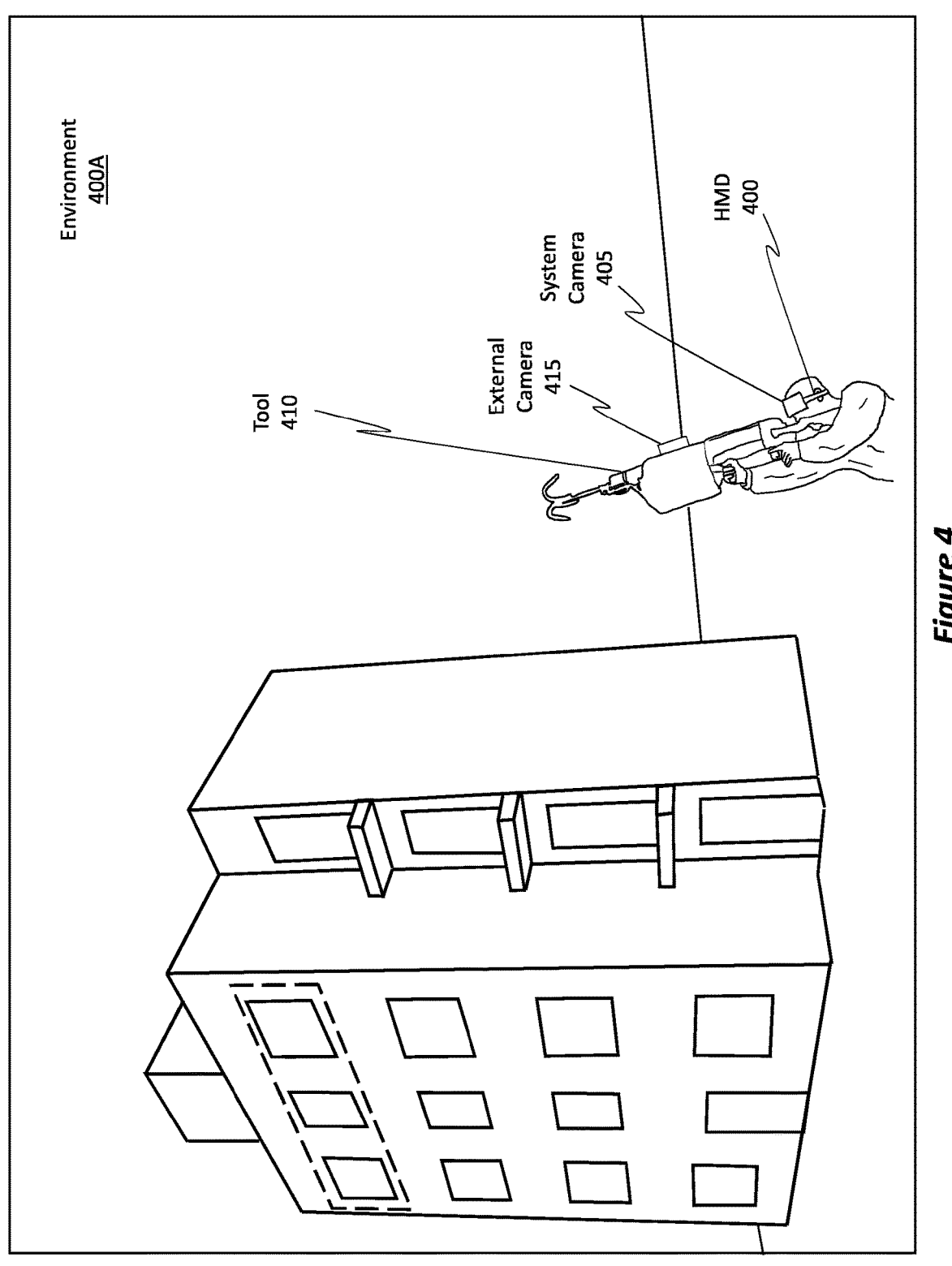
FIG. 4 illustrates another example scenario.

Attention will now be directed to FIG. 3, which illustrates an example scenario in which the HMDs discussed in FIGS. 1 and 2 may be used. FIG. 3 shows a building 300 and a first responder 305 and another first responder 310. In this example scenario, the first responders 305 and 310 are desirous to scale the building 300. FIG. 4 shows one example technique for performing this scaling feat.

FIG. 4 shows a first responder wearing an HMD 400, which is representative of the HMDs discussed thus far, in an environment 400A. HMD 400 includes a system camera 405, as discussed previously. Furthermore, the first responder is using a tool 410 that includes an external camera 415, which is representative of the external camera 255 of FIG. 2. In this case, the tool 410 is a grappling gun that will be used to shoot a rope and hook onto the building to allow the first responder to scale the building. By aligning the image content generated by the external camera 415 with the image content generated by the system camera 405, the user will be able to better discern where the tool 410 is being aimed.

Figure 5:
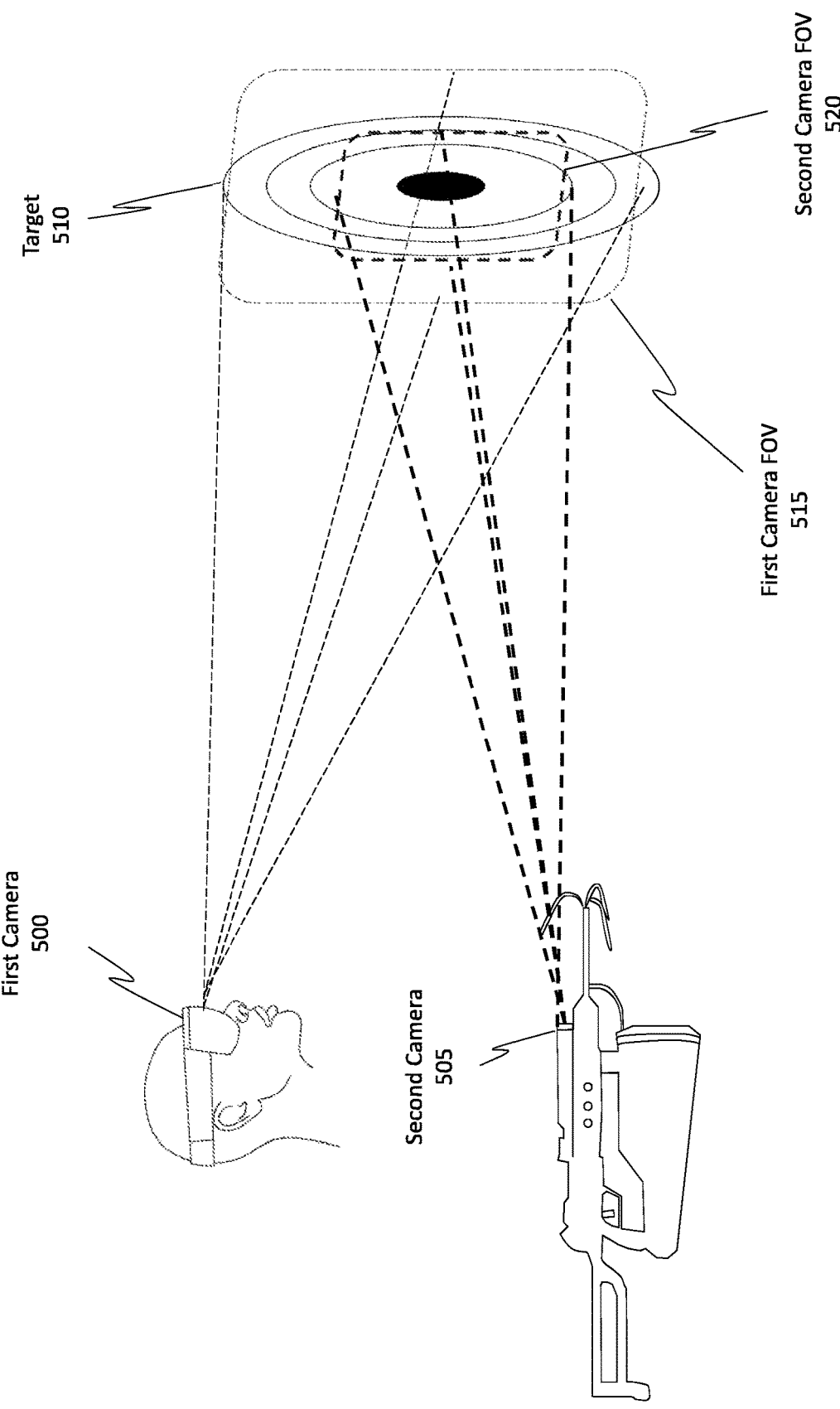
FIG. 5 illustrates how a system camera (e.g., a first camera) and an external camera (e.g., a second or peripheral camera) can be used to perform the disclosed operations.

That is, in accordance with the disclosed principles, it is desirable to provide an improved platform or technique by which a user (e.g., the first responders) can aim a tool (e.g., the tool 410) using the HMD 400, the system camera 405, and the external camera 415 as a combined aiming interface. FIG. 5 shows one such example.

FIG. 5 shows a first camera 500 (aka HMD camera) mounted on an HMD, where the first camera 500 is representative of the system camera 405 of FIG. 4, and a tool (e.g., a grappling gun) that includes an second camera 505, which is representative of the external camera 415. It should be noted how the optical axis of the second camera 505 is aligned with the aiming direction of the tool. As a consequence, the images generated by the second camera 505 can be used to determine where the tool is being aimed. One will appreciate how the tool can be any type of aimable tool, without limit.

In FIG. 5, both the first camera 500 and the second camera 505 are being aimed at a target 510. To illustrate, the field of view (FOV) of the first camera 500 is represented by the first camera FOV 515 (aka HMD camera FOV), and the FOV of the second camera 505 is represented by the second camera FOV 520. Notice, the first camera FOV 515 is larger than the second camera FOV 520. Typically, the second camera 505 provides a very focused view, similar to that of a scope (i.e. a high level of angular resolution). As will be discussed in more detail later, the second camera 505 sacrifices a wide FOV for an increased resolution and increased pixel density. Accordingly, in this example scenario, one can observe how in at least some situations, the second camera FOV 520 may be entirely overlapped or encompassed by the first camera FOV 515. Of course, in the event the user aims the second camera 505 in a direction where the first camera 500 is not aimed at, then the first camera FOV 515 and the second camera FOV 520 will not overlap.

Figure 6:
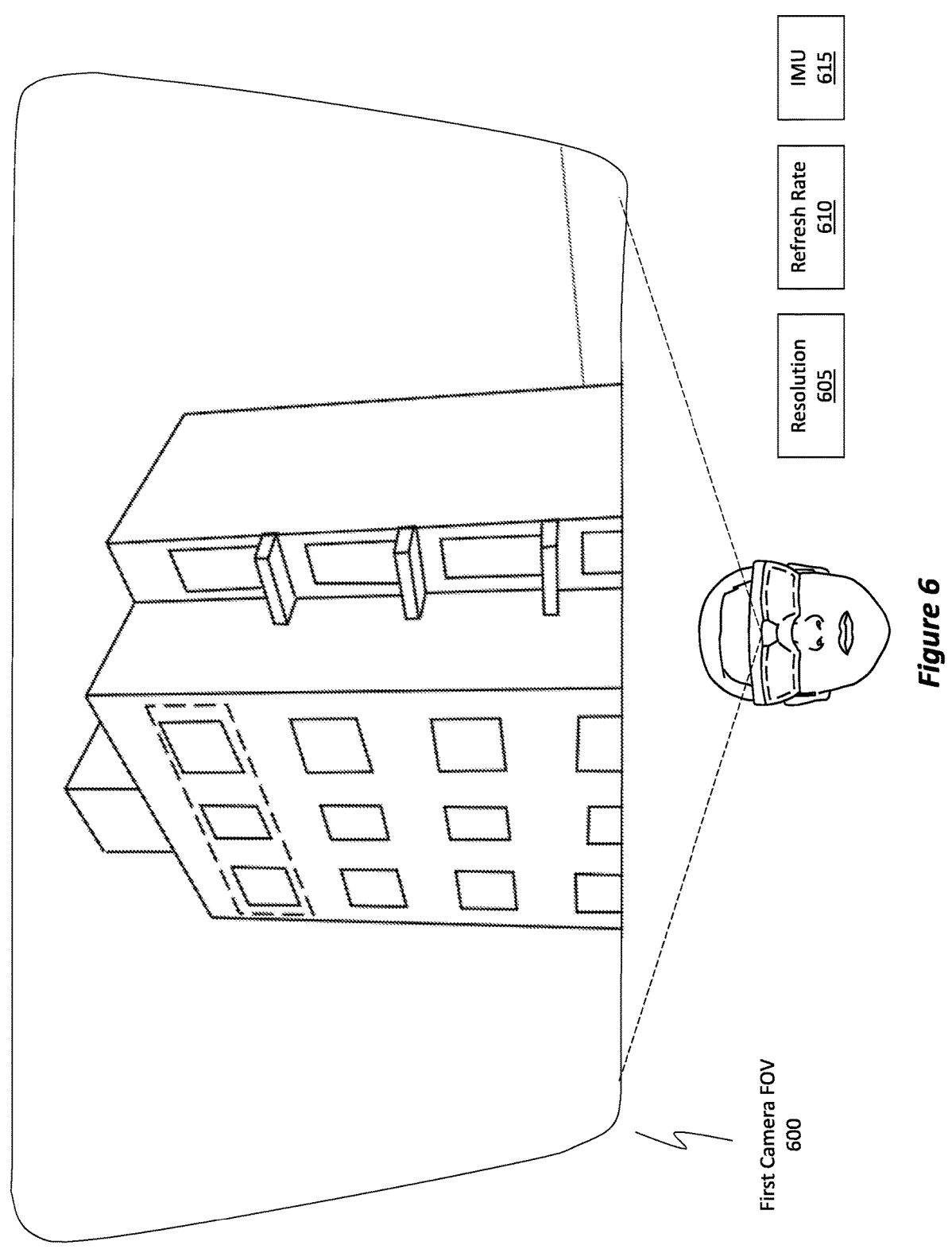
FIG. 6 illustrates the field of view (FOV) of a system camera.

FIG. 6 shows the first camera FOV 600, which is representative of the first camera FOV 515 of FIG. 5. The first camera FOV 600 will be captured by the system camera in the form of a system camera image and will potentially be displayed in the form of a passthrough image. The system camera images have a resolution 605 and are captured by the system camera based on a determined refresh rate 610 of the system camera. The refresh rate 610 of the system camera is typically between about 30 Hz and 120 Hz. Often, the refresh rate 610 is around 90 Hz or at least 60 Hz. Often, the first camera FOV 600 has at least a 55 degree horizontal FOV. The horizontal baseline of the first camera FOV 600 may extend to 65 degrees, or even beyond 65 degrees.

It should also be noted how the HMD includes a system (HMD) inertial measurement unit IMU 615. An IMU (e.g., system IMU 615) is a type of device that measures forces, angular rates, and orientations of a body. An IMU can use a combination of accelerometers, magnetometers, and gyroscopes to detect these forces. Because both the system camera and the system IMU 615 are integrated with the HMD, the system IMU 615 can be used to determine the orientation or pose of the system camera (and the HMD) as well as any forces the system camera is being subjected to.

In some cases, the "pose" may include information detailing the 6 degrees of freedom, or "6 DOF," information. Generally, the 6 DOF pose refers to the movement or position of an object in three-dimensional space. The 6 DOF pose includes surge (i.e. forward and backward in the x-axis direction), heave (i.e. up and down in the z-axis direction), and sway (i.e. left and right in the y-axis direction). In this regard, 6 DOF pose refers to the combination of 3 translations and 3 rotations. Any possible movement of a body can be expressed using the 6 DOF pose.

In some cases, the pose may include information detailing the 3 DOF pose. Generally, the 3 DOF pose refers to tracking rotational motion only, such as pitch (i.e. the transverse axis), yaw (i.e. the normal axis), and roll (i.e. the longitudinal axis). The 3 DOF pose allows the HMD to track rotational motion but not translational movement of itself and of the system camera. As a further explanation, the 3 DOF pose allows the HMD to determine whether a user (who is wearing the HMD) is looking left or right, whether the user is rotating his/her head up or down, or whether the user is pivoting left or right. In contrast to the 6 DOF pose, when 3 DOF pose is used, the HMD is not able to determine whether the user (or system camera) has moved in a translational manner, such as by moving to a new location in the environment.

Determining the 6 DOF pose and the 3 DOF pose can be performed using inbuilt sensors, such as accelerometers, gyroscopes, and magnetometers (i.e. the system IMU 615). Determining the 6 DOF pose can also be performed using positional tracking sensors, such as head tracking sensors. Accordingly, the system IMU 615 can be used to determine the pose of the HMD.

Figure 7:
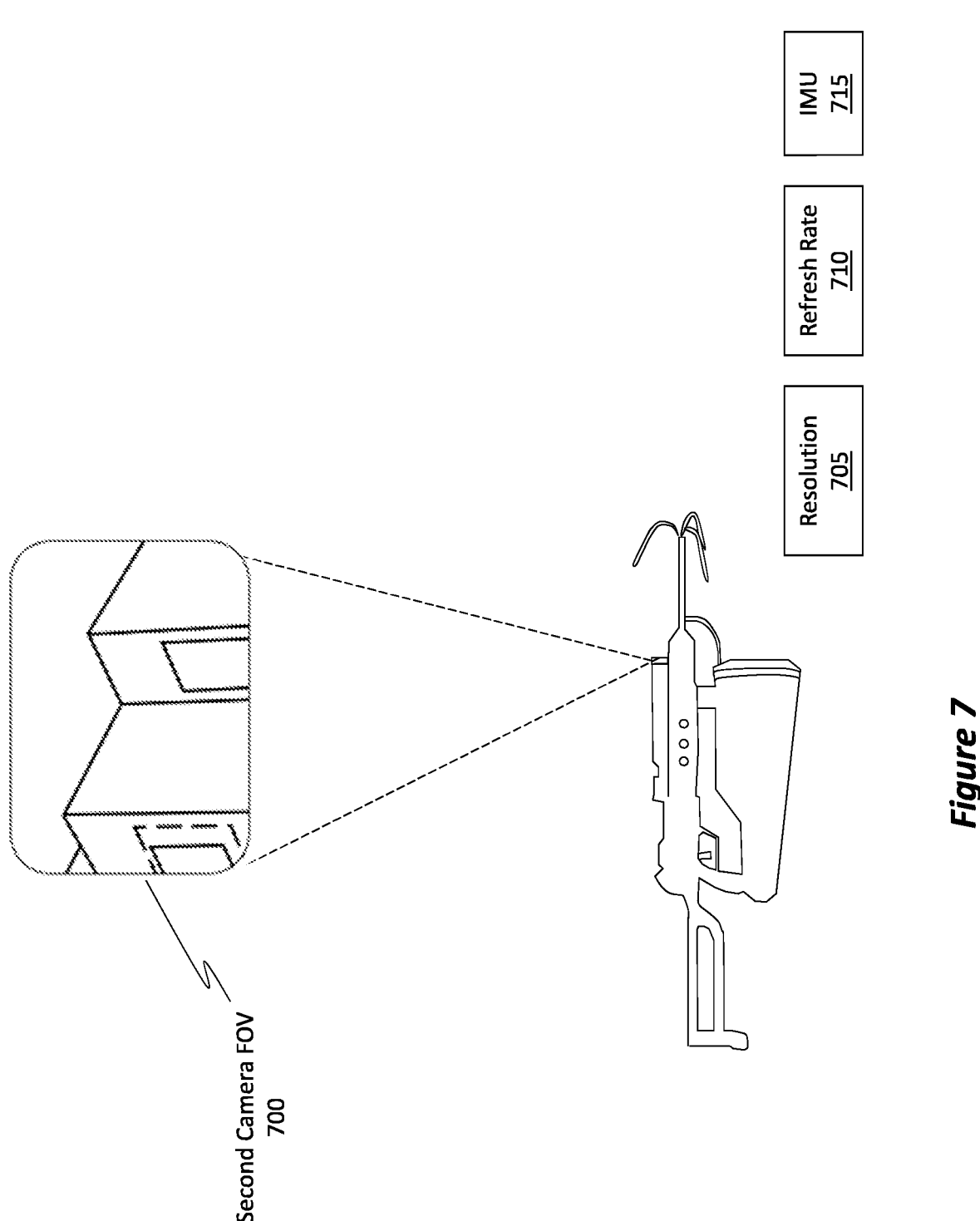
FIG. 7 illustrates the FOV of an external camera.

FIG. 7 shows an second camera FOV 700, which is representative of the second camera FOV 520 of FIG. 5. Notice, the second camera FOV 700 is smaller than the first camera FOV 600. That is, the angular resolution of the second camera FOV 700 is higher than the angular resolution of the first camera FOV 600. Having an increased angular resolution also results in the pixel density of an external camera image being higher than the pixel density of a system camera image. For instance, the pixel density of an external camera image is often 2.5 to 3 times that of the pixel density of a system camera image. As a consequence, the resolution 705 of an external camera image is higher than the resolution 605. Often, the second camera FOV 700 has at least a 19 degree horizontal FOV. That horizontal baseline may be higher, such as 20 degrees, 25 degrees, 30 degrees, or more than 30 degrees.

The external camera also has a refresh rate 710. The refresh rate 710 is typically lower than the refresh rate 610. For example, the refresh rate 710 of the external camera is often between 20 Hz and 60 Hz. Typically, the refresh rate 710 is at least about 30 Hz. The refresh rate of the system camera is often different than the refresh rate of the external camera. In some cases, however, the two refresh rates may be substantially the same.

The external camera also includes or is associated with an external IMU 715. Using this external IMU 715, the embodiments are able to detect or determine the orientation/pose of the external camera as well as any forces that the external camera is being subjected to. Accordingly, similar to the earlier discussion, the external IMU 715 can be used to determine the pose (e.g., 6 DOF and/or 3 DOF) of the external camera sight.

In accordance with the disclosed principles, it is desirable to overlap and align the images obtained from the external camera with the images generated by the system camera to generate an overlaid and aligned passthrough image. The overlap between the two images enables the embodiments to generate multiple images and then overlay image content from one image onto another image in order to generate a composite image or an overlaid image having enhanced features that would not be present if only a single image were used. As one example, the system camera image provides a broad FOV while the external camera image provides high resolution and pixel density for a focused area (i.e. the aiming area where the tool is being aimed). By combining the two images, the resulting image will have the benefits of a broad FOV and a high pixel density for the aiming area.

It should be noted that while this disclosure primarily focuses on the use of two images (e.g., the system camera image and the external camera image), the embodiments are able to align content from more than two images having overlapping regions. For instance, suppose 2, 3, 4, 5, 6, 7, 8, 9, or even 10 integrated and/or detached cameras have overlapping FOVs. The embodiments are able to examine each resulting image and then align specific portions with one another. The resulting overlaid image may then be a composite image formed from any combination or alignment of the available images (e.g., even 10 or more images, if available). Accordingly, the embodiments are able to utilize any number of images when performing the disclosed operations and are not limited to only two images or two cameras.

Figure 8:
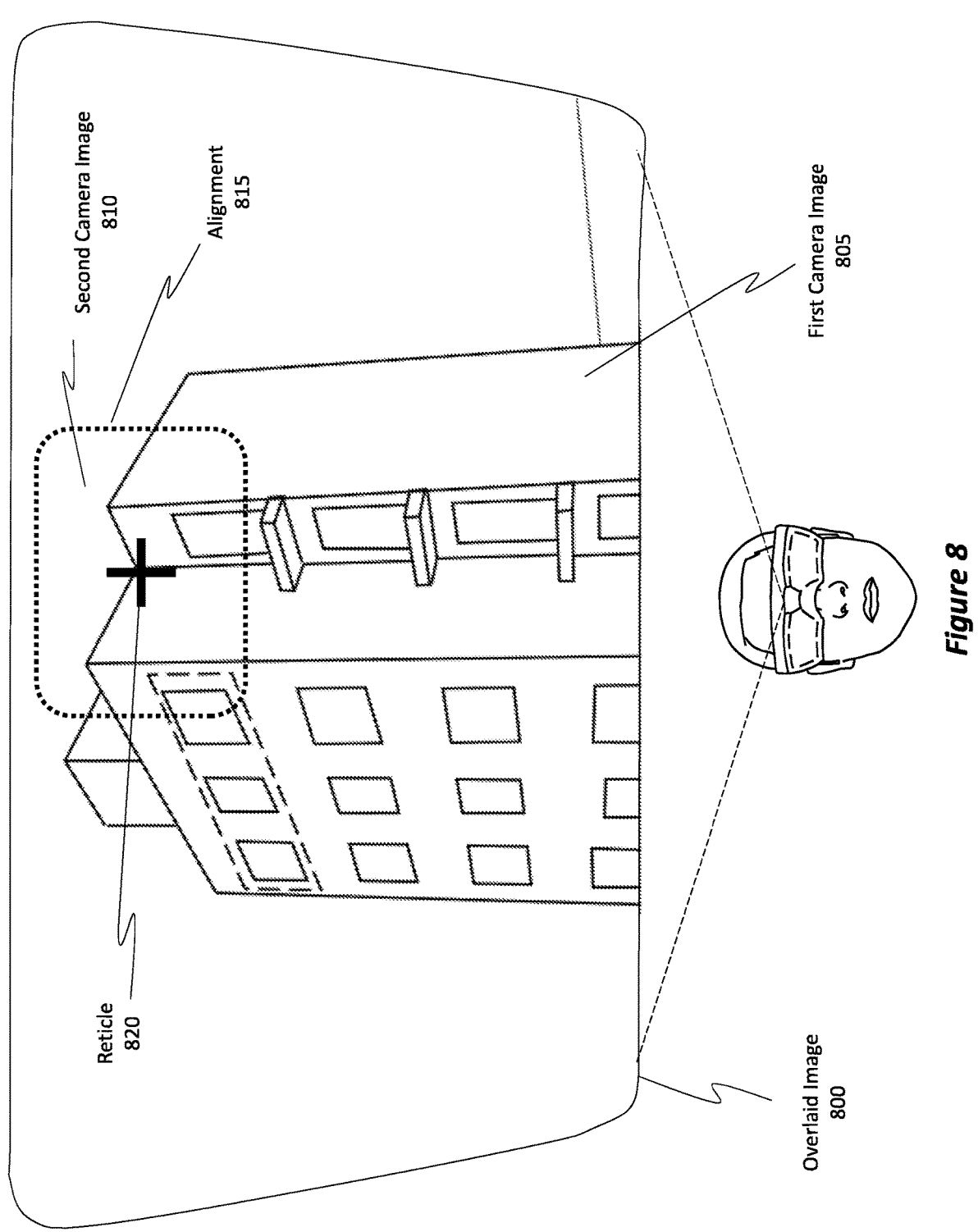
FIG. 8 illustrates an overlaid and aligned image in which image content from the external camera image is overlaid onto the system camera image.

As another example, suppose the system camera is a low light camera and further suppose the external camera is a thermal imaging camera. As will be discussed in more detail later, the embodiments are able to selectively extract image content from the thermal imaging camera image and overlay that image content onto the low light camera image. In this regard, the thermal imaging content can be used to augment or supplement the low light image content, thereby providing enhanced imagery to the user. Additionally, because the external camera has increased resolution relative to the system camera, the resulting overlaid image will provide enhanced clarity for the areas where the pixels in the external camera image are overlaid onto the system camera image. FIG. 8 provides an example of these operations and benefits.

Image Correspondences and Alignment

In accordance with the disclosed principles, the embodiments are able to align the system camera's image with the external camera's image. That is, because at least a portion of the two cameras' FOVs overlap with one another, as was described earlier, at least a portion of the resulting images include corresponding content. Consequently, that corresponding content can be identified and then a merged, fused, or overlaid image can be generated based on the similar corresponding content. By generating this overlaid image, the embodiments are able to provide enhanced image content to the user, which enhanced image content would not be available if only a single image type were provided to a user. Both the system camera's image and the external camera's images may be referred to as "texture" images.

Different techniques can be used to perform the alignment. One technique is the "visual alignment" technique involving the detection of feature points. Another technique is the IMU-based technique that aligns images based on determined poses of the respective cameras. The visual alignment technique usually produces more accurate results.

Regarding the visual alignment technique, to merge or align the images, some embodiments are able to analyze the texture images (e.g., perform computer vision feature detection) in an attempt to find any number of feature points. As used herein, the phrase "feature detection" generally refers to the process of computing image abstractions and then determining whether an image feature (e.g., of a particular type) is present at any particular point or pixel in the image. Often, corners (e.g., the corners of a wall), distinguishable edges (e.g., the edge of a table), or ridges are used as feature points because of the inherent or sharp contrasting visualization of an edge or corner.

Any type of feature detector may be programmed to identify feature points. In some cases, the feature detector may be a machine learning algorithm. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In accordance with the disclosed principles, the embodiments detect any number of feature points (e.g., 1, 2, 3, 4, 5, 6, 7, 8, 9, 10, 20, 30, 40, 50, 60, 70, 80, 90, 100, 200, 500, 1,000, 2,000, or more than 2,000) and then attempt to identify correlations or correspondences between the feature points detected in the system camera image and the feature points identified in the external camera image. As will be described in more detail later, some examples of a feature point include corners (aka corner features) and lines (aka line features).

Some embodiments then fit the feature or image correspondence(s) to a motion model in order to overlay one image onto another image to form an enhanced overlaid image. Any type of motion model may be used. Generally, a motion model is a type of transformation matrix that enables a model, a known scene, or an object to be projected onto a different model, scene, or object. The feature points are used as reference points when reprojecting the images.

In some cases, the motion model may simply be a rotational motion model. With a rotational model, the embodiments are able to shift one image by any number of pixels (e.g., perhaps 5 pixels to the left and 10 pixels up) in order to overlay one image onto another image. For instance, once the image correspondences are identified, the embodiments can identify the pixel coordinates of those feature points or correspondences. Once the coordinates are identified, then the embodiments can overlay the external camera sight's image onto the HMD camera's image using the rotational motion model approach described above.

In some cases, the motion model may be more complex, such as in the form of a similarity transform model. The similarity transform model may be configured to allow for (i) rotation of either one of the HMD camera's image or the external camera sight's image, (ii) scaling of those images, or (iii) homographic transformations of those images. In this regard, the similarity transform model approach may be used to overlay image content from one image onto another image. Accordingly, in some cases, the process of aligning the external camera image with the system camera image is performed by (i) identifying image correspondences between the images and then, (ii) based on the identified image correspondences, fitting the correspondences to a motion model such that the external camera image is projected onto the system camera image.

Another technique for aligning images includes using IMU data to predict poses of the system camera and the external camera. Once the two poses are estimated or determined, the embodiments then use those poses to align one or more portions of the images with one another. Once aligned, then one or more portions of one image (which portions are the aligned portions) are overlaid onto the corresponding portions of the other image in order to generate an enhanced overlaid image. In this regard, IMUs can be used to determine poses of the corresponding cameras, and those poses can then be used to perform the alignment processes. IMU data is almost always readily available. Sometimes, however, the visual alignment process might not be able to be performed.

FIG. 8 shows a resulting overlaid image 800 comprising portions (or all) of a system (HMD) camera image 805 (i.e. an image generated by the system camera) and an external camera image 810 (i.e. an image generated by the external camera). These images are aligned using an alignment 815 process (e.g., visual alignment, IMU-based alignment, and/ or hardware-based alignment). Optionally, additional image artifacts can be included in the overlaid image 800, such as perhaps a reticle 820 used to help the user aim the tool. By aligning the image content, a user of the tool can determine where the tool is being aimed without having to look down the tool's sights. Instead, the user can discern where the tool is being aimed by simply looking at the content displayed in his/her HMD.

Figure 9:
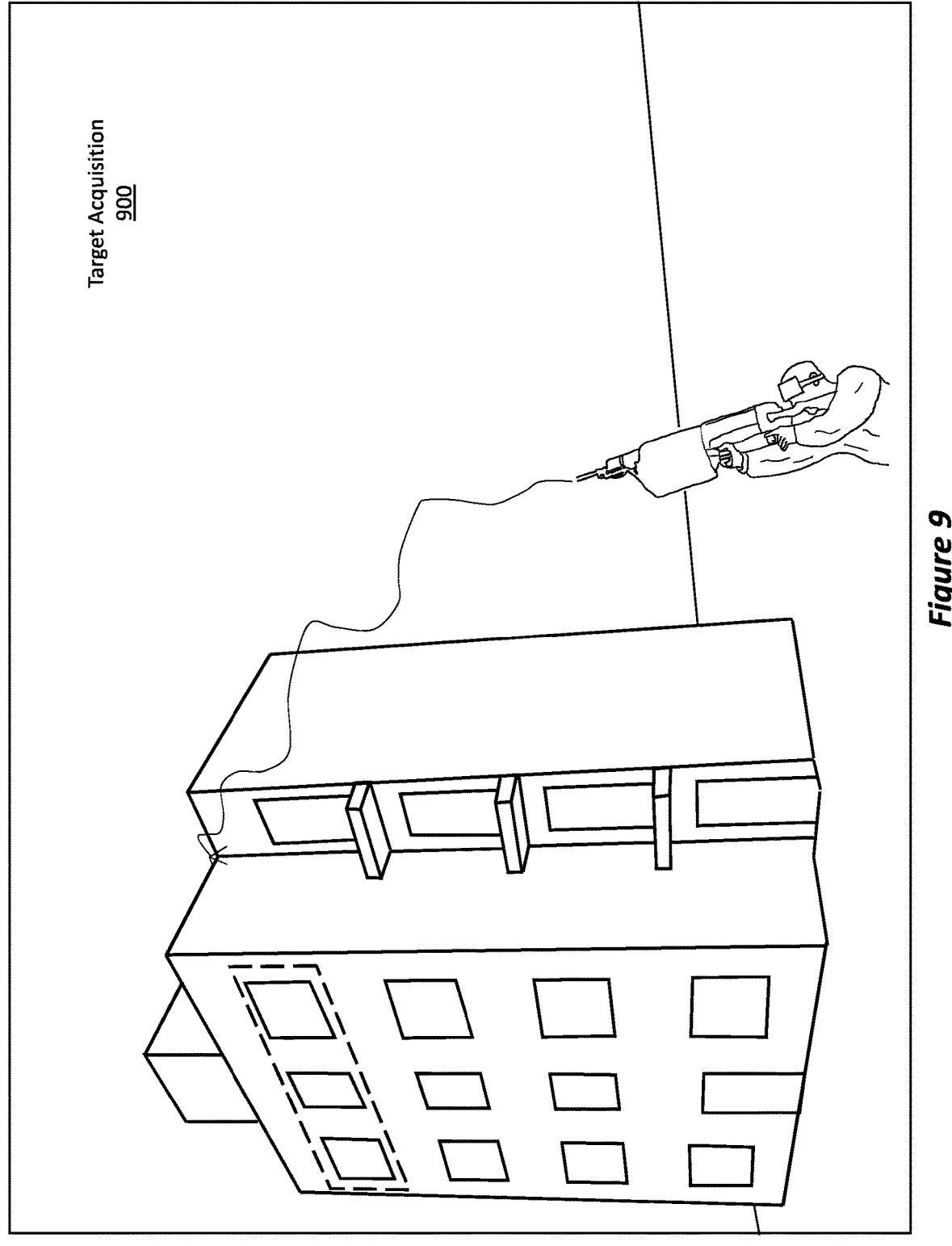
FIG. 9 illustrates another example scenario in which the principles may be practiced.

Providing the enhanced overlaid image 800 allows for rapid target acquisition, as shown by target acquisition 900 in FIG. 9. That is, a target can be acquired (i.e. the tool is accurately aimed at a desired target) in a fast manner because the user no longer has to take time to look through the tool's sights.

Visual Alignment Approach

Figure 10:
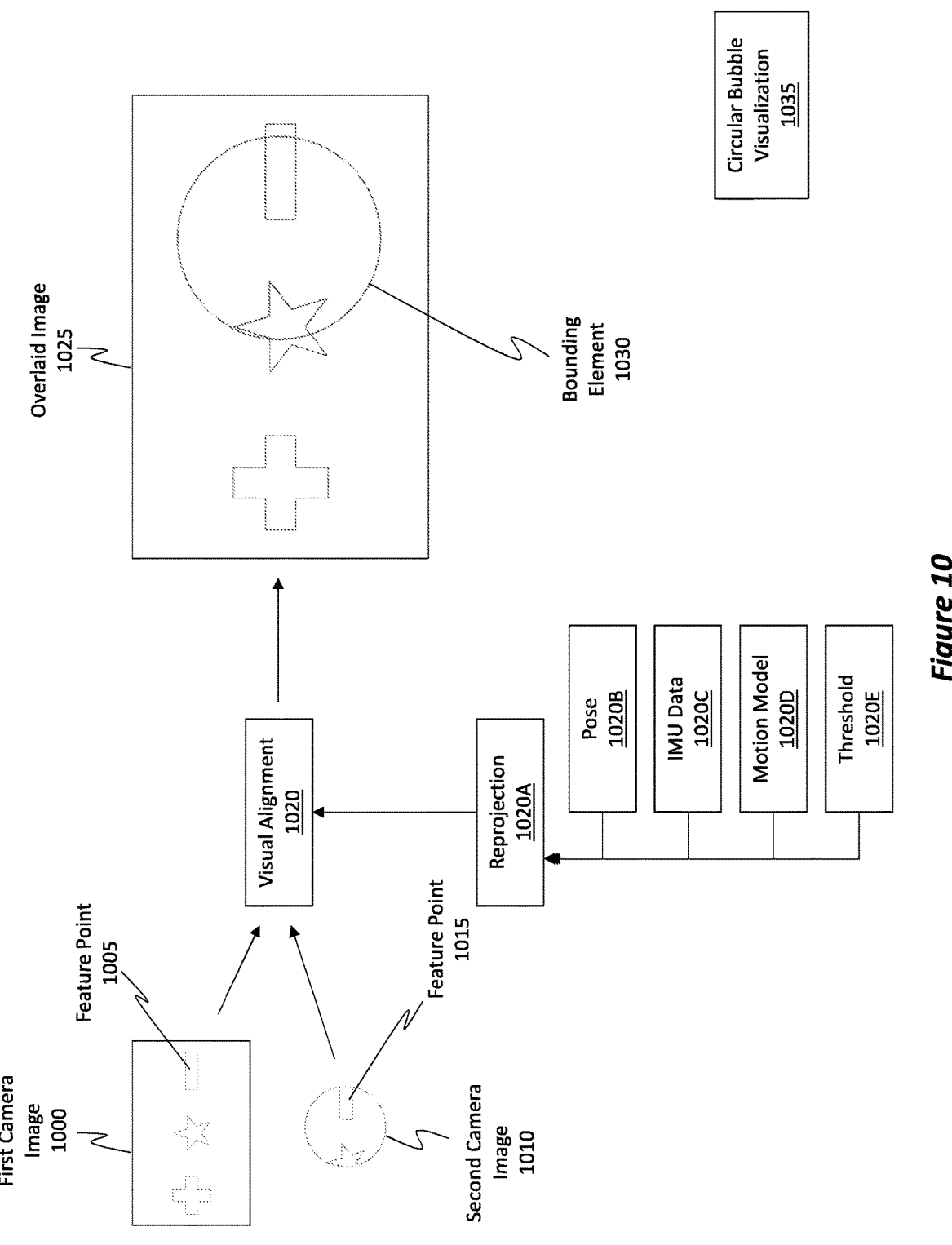
FIG. 10 illustrates how an external camera image can be overlaid onto a system camera image using a visual alignment process and how a bounding element can be displayed in a manner so as to surround the content from the external camera image.

FIG. 10 shows an abstracted version of the images discussed thus far and is focused on the visual alignment approach. In particular, FIG. 10 shows a first camera image 1000 having a feature point 1005 and an second camera image 1010 having a feature point 1015 that corresponds to the feature point 1005. The embodiments are able to perform a visual alignment 1020 between the first camera image 1000 and the second camera image 1010 using the feature points 1005 and 1015.

The visual alignment 1020 can be performed via a reprojection 1020A operation in which a pose 1020B embodied in the first camera image 1000 and/or a pose embodied in the second camera image 1010 is reprojected to a new position to cause one of those images to align with the other image. The reprojection 1020A can be facilitated using movement data, such as perhaps inertial measurement unit (IMU) data 1020C. For instance, IMU data can be collected to describe any movements that occurred between the time the first camera image 1000 was taken and the time the second camera image 1010 was taken. That IMU data 1020C can then be used to transform a motion model 1020D to perform the reprojection 1020A. The visual alignment 1020 can also be dependent on ensuring that a threshold 1020E number of features from the second camera image 1010 correspond to similar ones found in the first camera image 1000.

A result of performing the visual alignment 1020 is that the overlaid image 1025 is produced. The overlaid image 1025 includes portions extracted or obtained from the first camera image 1000 and portions extracted or obtained from the second camera image 1010. Notice, in some embodiments, the overlaid image 1025 includes a bounding element 1030 encompassing pixels that are obtained from the second camera image 1010 and/or from the first camera image 1000. Optionally, the bounding element 1030 may be in the form of a circular bubble visualization 1035. Other shapes may be used for the bounding element 1030, however.

Staggered Feature Extraction

Figure 11A:
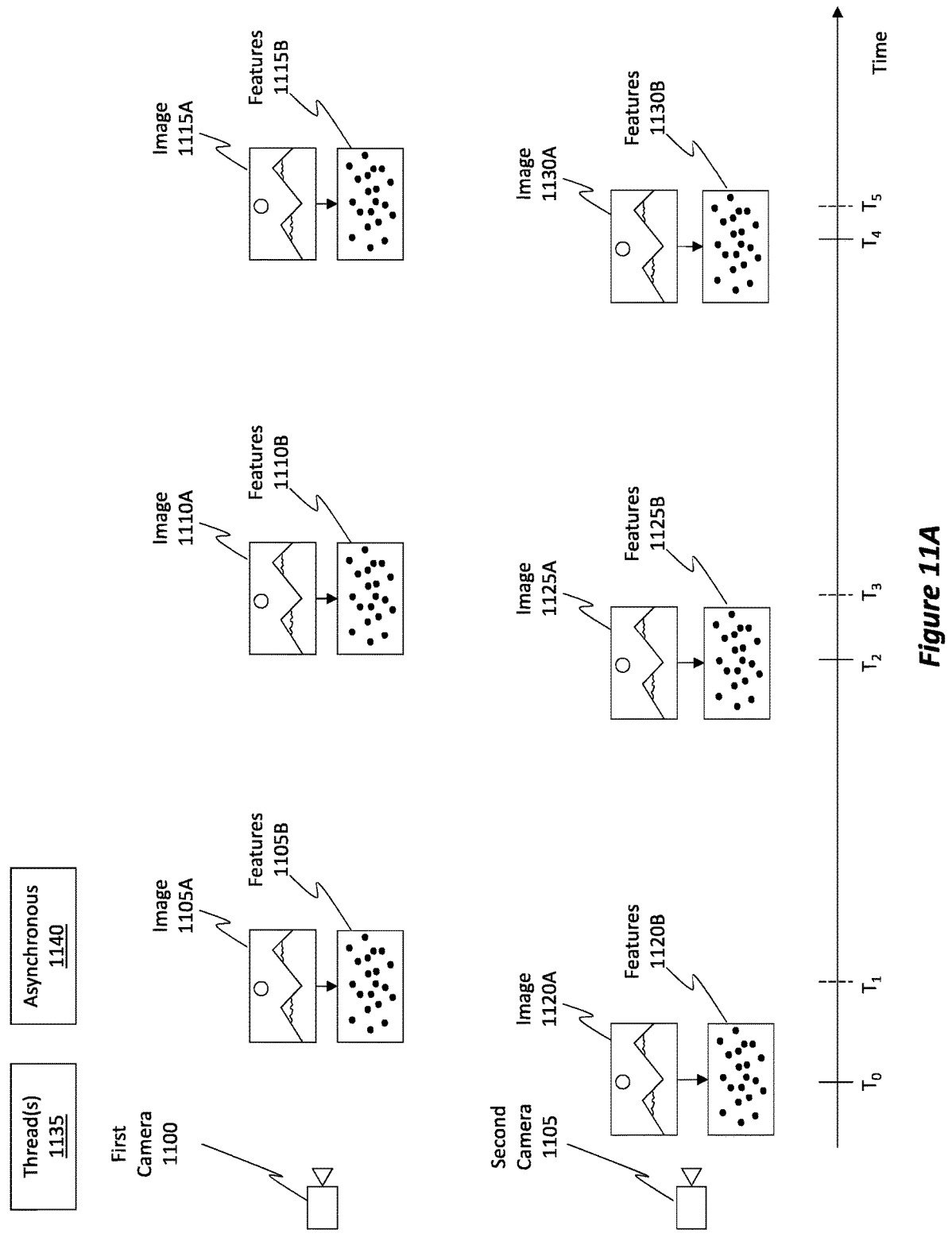
FIGS. 11A, 11B, and 11C illustrate various aspects related to staggered feature extraction.
Figure 11B:
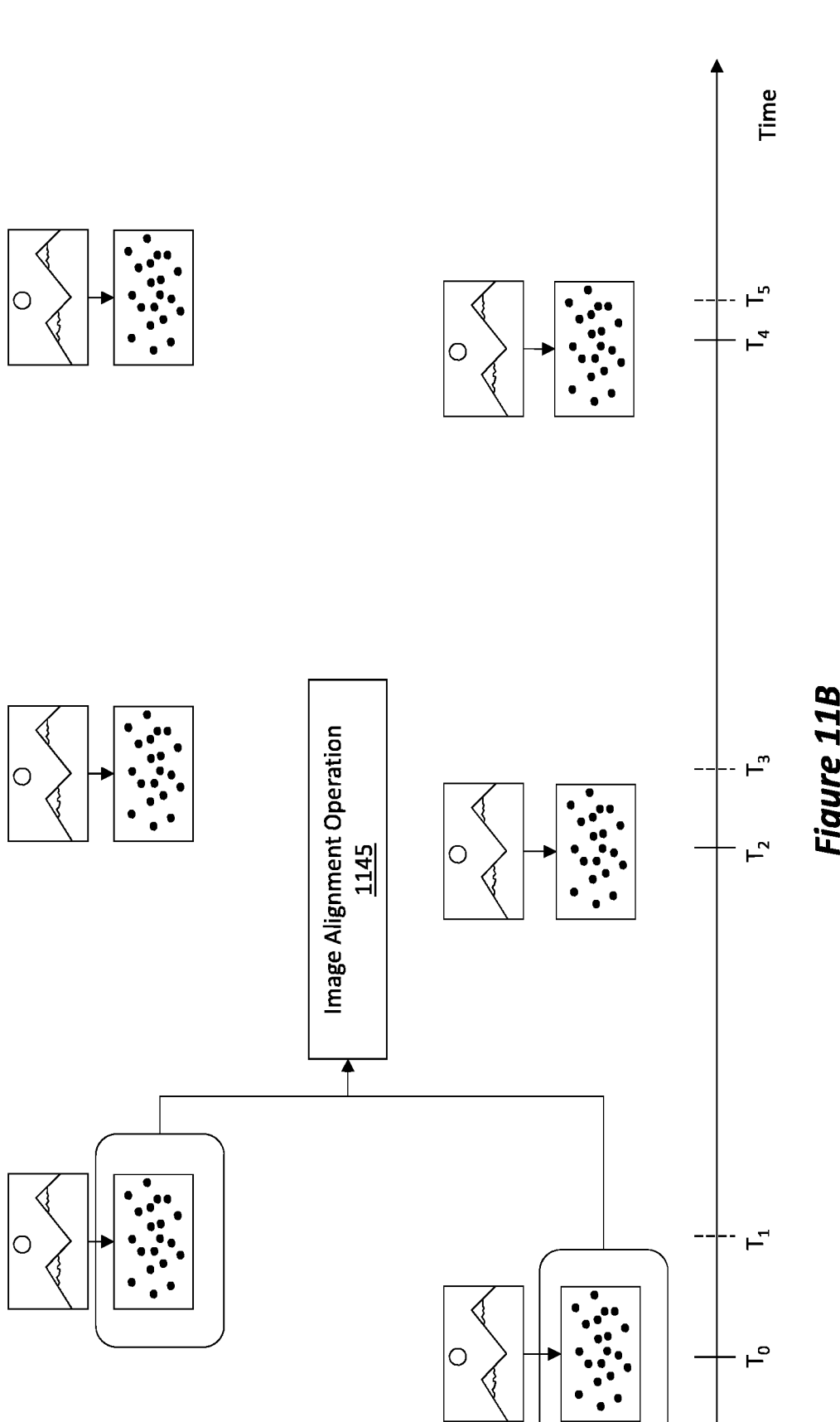
Figure 11C:
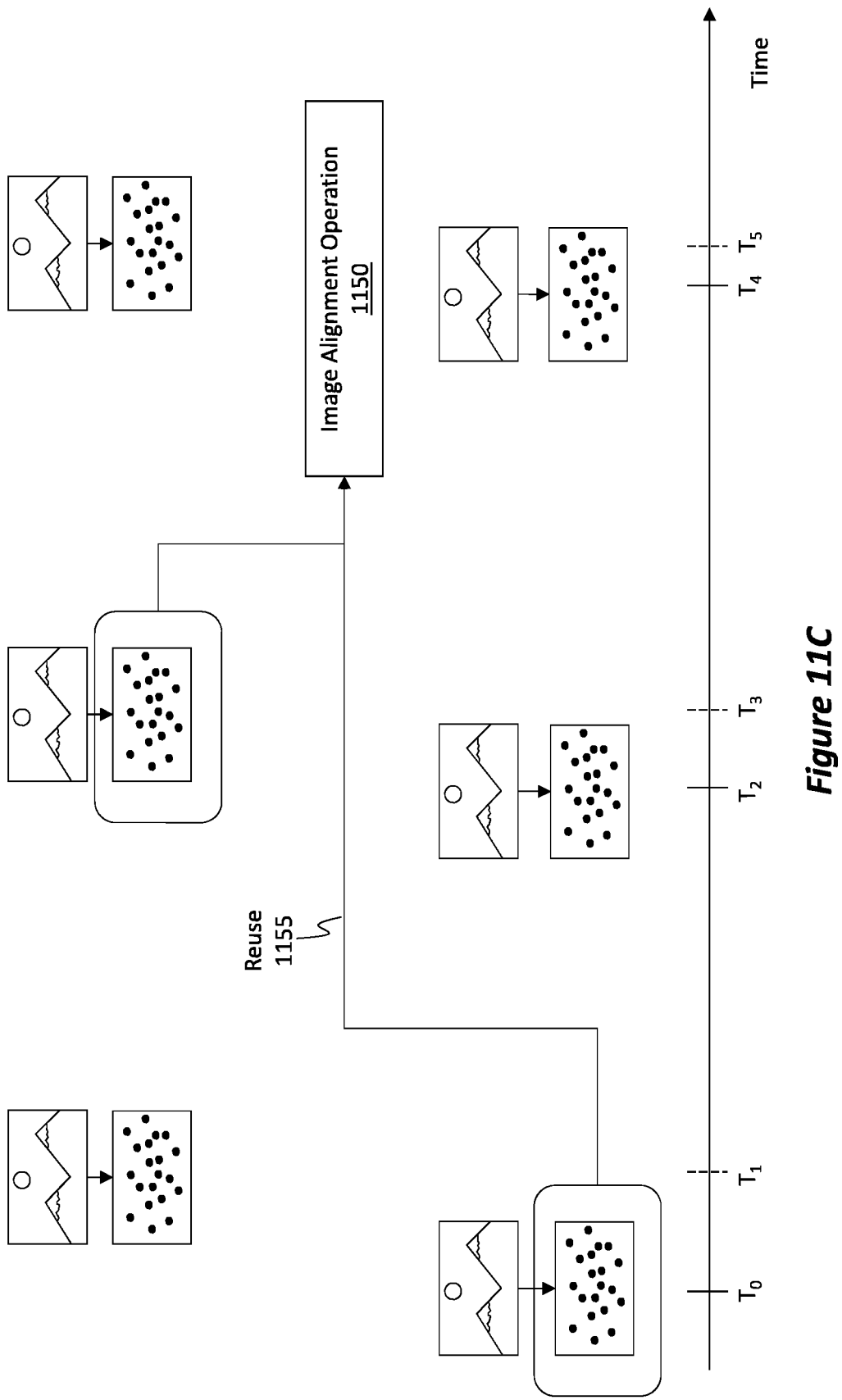

Having just described some of the various processes for identifying features (aka feature points) and aligning images using those features, attention will now be directed to FIGS. 11A, 11B, and 11C, which illustrate various processes for performing staggered feature extraction.

FIG. 11A shows an example scenario involving a first camera 1100 and a second camera 1105, which are representative of the cameras mentioned previously. The first camera 1100 is shown as generating an image 1105A at time $T_1$. The embodiments process the image 1105A to generate a set of features 1105B. Note, the timing for when the features 1105B will be generated will be after time $T_1$ because there is processing time needed to perform the feature extraction as well as time needed for pre-processing the image. The timing can also be dependent on when the pre-processing and feature extraction steps are scheduled to be run. A feature extraction process, operation, or technique is performed to identify these features 1105B. The time needed to perform the feature extraction can vary based on different factors, such as the complexity of the image, the resolution of the image, the image type, whether historical data is available (e.g., features from previous images can be used to help initially isolate or focus the feature extractor to a particular region of an image to identify features), and so on.

At time $T_3$, the first camera 1100 generates another image 1110A, and another set of features 1110B are generated. Similarly, at time $T_5$, another image 1115A is generated, along with a corresponding set of features 1115B. Notably, the set of features 1115B are typically generated after the arrival of the images, as indicated above. For instance, a delay can occur based on the time needed to perform pre-processing and feature extraction. The delay can also be based on scheduling as to when those tasks occur. Thus, it is typically the case that the features are generated some time after the arrival of the image.

The second camera 1105 is shown as generating an image 1120A at time $T_0$. A set of features 1120B are identified from that image 1120A. At time $T_2$, the second camera 1105 generates another image 1125A, and another set of features 1125B are generated. Similarly, at time $T_4$, another image 1130A is generated, along with a corresponding set of features 1130B.

The processing involved with analyzing the various different images and generating the features can be performed in various different ways. In some cases, a single computing thread is relied on to perform the processing. In some cases, multiple thread(s) 1135 are relied on. For instance, a first thread can be tasked with analyzing the images generated by the first camera 1100, and a second thread can be tasked with analyzing the images generated by the second camera 1105. Stated differently, in some embodiments, a first computing thread is dedicated to processing images generated by the first camera, and a second computing thread is dedicated to processing images generated by the second camera.

In some implementations, the cameras are not synchronized with one another. That is, in some embodiments the cameras operate in an asynchronous 1140 manner. Thus, the images may arrive at different times relative to one another. In some cases, the generation of the images may be synchronized, but the feature extraction may be asynchronous due to differences in the images.

FIG. 11B shows a scenario in which an image alignment operation 1145 is being performed. This image alignment operation 1145 is performed using the processes described earlier and is based on identified correlations between features. Notice, this image alignment operation 1145 is performed even though the image 1105A arrived after the image 1120A (e.g., time $T_1$ versus $T_0$). The embodiments are able to use IMU data to reproject the features 1120B to cause the pose of the image 1120A to match the pose of the image 1105A, in the manner described previously.

FIG. 11C shows a new image alignment operation 1150. In accordance with the disclosed principles, the embodiments are able to reuse a previously used set of features to perform a subsequent image alignment operation. For instance, FIG. 11C is showing how the embodiments reuse the features 1120B instead of using the newer features 1125B. Although the features 1120B are older than the features 1125B, the embodiments can still use IMU data to perform the various reprojections in order to properly align the poses.

Reusing a set of features that have already been used can be beneficial for a number of reasons. For instance, it may be the case that the frame rates of the different cameras are quite different; perhaps one camera operates at 60 frames per second (FPS) while the other operates at 30 FPS. In some cases, the frame rates of the cameras can be between 30 FPS and 120 FPS.

By reusing features, the embodiments can avoid having to wait until a fresh set of features are identified in a new image. As a result, the embodiments can avoid latency involved with the wait.

As another example, the embodiments can avoid or reduce the latency that is involved with not only waiting for a new frame to be generated but also the latency that is involved with performing feature extraction on that new frame. When a new frame comes in, some embodiments operate in parallel by performing feature extraction on the new frame while simultaneously performing visual alignment by reusing features from an older frame, even if those features have already been used. The newly generated features can then be used during a subsequent visual alignment operation. From this discussion, one can readily discern the various timing benefits that the disclosed principles provide, particularly with regard to avoiding various pitfalls with delay.

Figure 12:
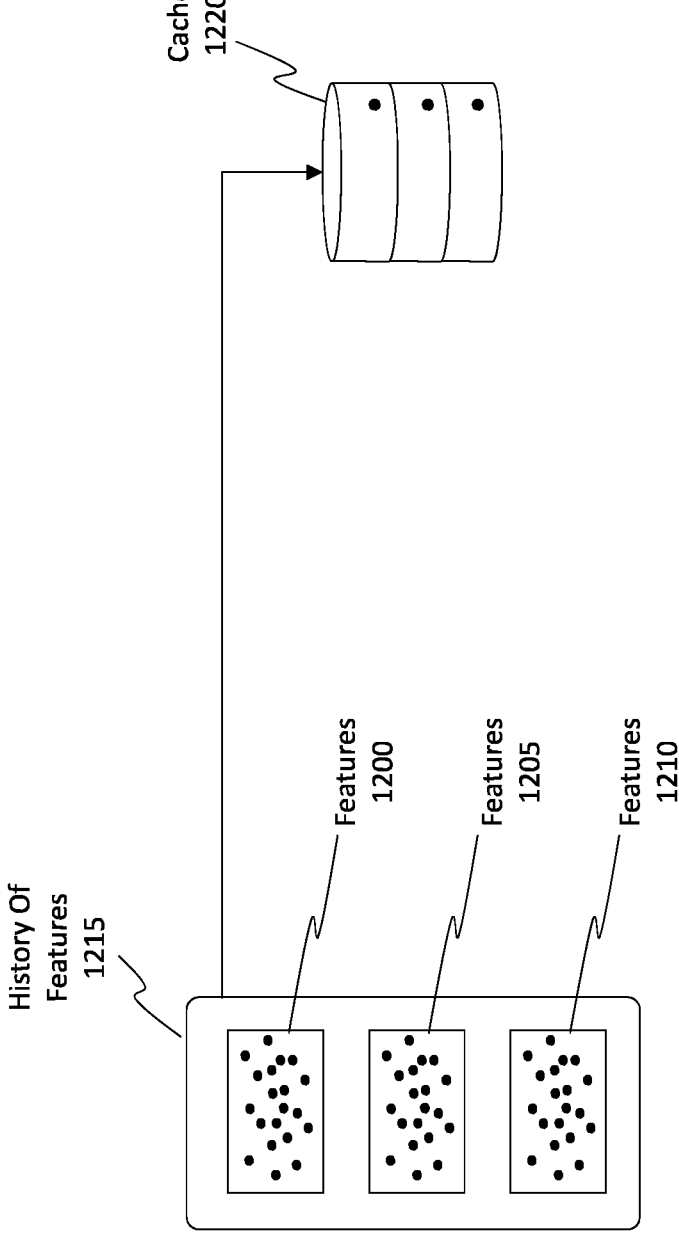
FIG. 12 illustrates an example technique for aggregating multiple permutations of features.

Over the course of time, a camera will generate multiple frames, and multiple features will be generated. That is, from within each frame, a set of features can be identified. In accordance with the disclosed principles, the embodiments are beneficially able to aggregate the features that are generated over time as a result of performing feature extraction on multiple images generated by a single camera. The embodiments can then store or cache this history of features for various beneficial uses, which will be discussed momentarily. FIG. 12 is illustrative.

FIG. 12 shows three sets of features, namely, features 1200, 1205, and 1210. These features were generated from images generated by a single camera. As an example, features 1200 might correspond to features 1105B, which is associated with image 1105A. Features 1205 might correspond to features 1110B, which is associated with image 1110A. Features 1210 might correspond to features 1115B, which is associated with image 1115A. Images 1105A, 1110A, and 1115A were all generated by the same camera, namely, camera 1100.

The embodiments are able to acquire IMU data for each of the images produced by the camera. The embodiments can then use this IMU data to reproject the poses in the image to a common pose. The result is that the features are all projected into the same pose. The embodiments can then form a union, or aggregation, of the various features to form an aggregated history of features 1215. This history of features 1215 can be stored, such as in the cache 1220. Accordingly, in some embodiments, a set of features are cached and are made available for repeated use during multiple image alignment operations.

Storing an aggregated set of features is beneficial for a variety of reasons. For instance, suppose the camera is operating in a low light environment or perhaps an isothermal or low-contrast environment. It may be the case that during feature extraction on an image, the feature extractor might be able to identify only a select few features within any single image. If visual alignment were attempted using only a few features, the visual alignment would likely fail.

On the other hand, if the feature extractor can identify features from multiple different images, there is a higher likelihood of being able to identify a significantly higher number of unique features. The embodiments can then harvest or utilize this aggregated set of features to then perform visual alignment. Thus, maintaining a repository or a history of features for a camera can be quite beneficial because it can help with the visual alignment process.

In this regard, a first history of feature extraction results (e.g., features) can be preserved for the first camera in the cache 1220. Similarly, a second history of feature extraction results can be preserved for the second camera. In some cases, the generation of the first set of features and the generation of the second set of features are performed asynchronously. Similarly, the generation of the first image can be performed asynchronously relative to the generation of the second image.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Attention will now be directed to FIG. 13A, which illustrates a flowchart of an example method 1300A for performing image alignment between a first image generated by a first camera and a second image generated by a second camera, where the image alignment is performed using staggered feature extraction in which a set of features are reused to align the second image with the first image. Method 1300A can optionally be performed using the HMD 100 of FIG. 1. In some cases, method 1300A can be performed by a cloud service operating in a cloud environment.

Method 1300A includes an act (act 1305) of accessing the first image, which was generated by the first camera. For instance, the first image might be the image 1110A of FIG. 11A, or perhaps any of the other images. The first camera can optionally be the first camera 1100.

Act 1310 includes identifying a first set of features from within the first image by performing feature extraction on the first image. For instance, the features 1110B from FIG. 11A can be extracted or identified by performing feature extraction on the image 1110A.

Act 1315 is shown as being out-of-sync or asynchronous with the performance of act 1305 and perhaps even act 1310. Act 1315 includes determining not to wait until a current image is generated by the second camera before proceeding with a current image alignment operation. This determining is based on a determination that waiting for the current image will introduce a latency in performing the current image alignment operation, where the introduced latency will exceed a permissible latency threshold. For instance, consider the scenario presented in FIG. 11A. Notice, image 1110A and image 1125A are generated at times $T_3$ and $T_2$, respectively. It may be the case that these two times are relatively close to one another. In some scenarios, however, it may be the case that the image 1125A has a significantly higher resolution or image content than the image 1110A. Stated differently, it may be the case that one of the first image or the second image has a higher image resolution than the other of the first image or the second image.

Optionally, the determination of using the single-threaded staggered feature extraction implementation of image alignment, which can wait for the arrival of a new image, can be determined at build time or is dependent on configuration. In some cases, one of the cameras can be chosen to reduce latency between image arrival from the camera and alignment result output.

The single-threaded staggered feature extraction cycle can start with waiting for new image from the camera (e.g., the first camera). Then, preprocessing and feature extraction can be performed on that image. Feature matching can then be performed on the feature set extracted and latest feature set cached from the second camera. The alignment calculation is then performed. Such processes minimize the time between arrival of image from the first camera to the alignment result generated with that image. Then, the cycle can continue by obtaining the latest available image from the second camera, preprocessing and extracting features from it, and then performing feature matching and alignment calculations using the feature set extracted and the latest cached first camera feature set, which was generated in the first half of the cycle.

It should also be noted that if a single-threaded implementation is used, then these processes may be performed in serial with one another. If multiple threads are used, then the processes can be performed in parallel. Furthermore, after generating the image alignment result using the latest image from the first camera and latest feature set extracted from the second camera, the embodiments can repeat the processes using the latest image from the second camera and the feature set extracted from the first camera's image.

Returning to the earlier discussion, in some cases, the feature extraction processes performed on image 1125A may take significantly longer than the feature extraction processes performed on image 1110A. The embodiments are able to determine that they will not wait until the features 1125B for image 1125A are generated. Instead, the embodiments can elect to perform a visual alignment operation using an older set of features, such as perhaps features 1120B for image 1120A, which was generated at time $T_0$. In accordance with the disclosed principles, those older features have already been used at least once during a previous image alignment operation.

Based on the above decision, the embodiments then access (act 1320) the second image, which was generated by the second camera. Notably, the second image was generated prior in time to generation of the first image, so the features associated with that image are older than the features associated with the first image. The first image might be of a first image type, and the second image might be of a second image type, which is different from the first image type. In some cases, they may be of the same image type.

Instead of waiting for a current image, act 1325 includes accessing a second set of features, which were previously detected within the second image. The second set of features were previously used at least once to perform a previous image alignment operation between the second image and a different image. For instance, the features 1120B from FIG. 11A may be representative of these "second set of features" in method 1300A. In FIG. 11B, the features 1120B are being used a first time in the image alignment operation 1145. Then, in FIG. 11C, the same set of features 1120B are being reused (i.e. being used at least one additional time) in the image alignment operation 1150. Accordingly, in some embodiments, the second set of features are generated prior in time to when the first set of features are generated. Further, the second set of features are accessible before the first set of features are accessible.

Act 1330A then includes performing a current image alignment operation by using the first set of features and by reusing the second set of features to align the first image with the second image based on identified correspondences between the first set of features and the second set of features. As a result of performing the current image alignment operation, a second portion of the second image is identified as corresponding to a first portion of the first image. Recall, the visual alignment operation includes the use of movement data (e.g., perhaps IMU data) to reproject the image (and thus its features) to a new pose that matches the pose embodied in the first image. Stated differently, the process of performing the current image alignment can include accessing inertial measurement unit (IMU) data from one or both of the first camera and the second camera. The process can then include subsequently reprojecting one or both of the first image and the second image to a common pose. In some cases, that pose will be the pose of the later-generated image. Stated differently, the IMU data can be used to update data used to perform the image alignment operations. Such an update can, for example, include computing the alignment at a common timestamp for the cameras.

In cases where the first and second images are of differing types, the current image alignment operation will then be performed using images of differing image types. Furthermore, the identified correspondences between the first and second set of features can be performed using features obtained from differing image types.

The current image alignment operation can be performed using a motion model. This motion model facilitates reprojection of a pose embodied in one of the first or second images to align it with a pose embodied in the other one of the first or second images. Typically, the earlier-generated image will have its pose reprojected to match, align, or correspond with the pose in the later-generated image. In some implementations, the poses in both images can optionally be reprojected to correspond to a new pose, such as perhaps a pose that is a predicted pose. This predicted pose can be an estimated or predicted pose of the camera at some future point in time.

After performing the current image alignment operation, act 1335A includes generating an aligned image by overlaying the second portion that originated from the second image onto the first image. Stated differently, the process of generating an alignment image can include generating the transforms that are needed to overlay the first image (or a portion thereof) over the second image, or vice versa, according to the alignment result. Notably, the second portion is overlaid onto the first portion of the first image. FIGS. 8 and 10 were representative of this overlaid image. As shown in FIG. 10, a boundary can be included in the aligned image. This boundary can be structured to encompass the second portion that originated from the second image.

In some cases, those same second set of features can be reused for a subsequent image alignment operation. As a result, the second set of features are used at least three times. In some cases, they might be used more than three times, such as perhaps 4 times, 5, 6, 7, 8, 9, or perhaps even 10 times. The embodiments can use IMU date to reproject the feature points to a new pose in order to perform the alignment. The same feature points can be reused any number of times, provided the FOVs of the cameras stay generally aligned with one another.

In some cases, the method can further include aggregating the first set of features with additional features that are detected within one or more other images generated by the first camera. The embodiments can then cache the aggregated set of features. In some cases, the first set of features are cached, and the first set of features are then subsequently used for one or more subsequent image alignment operations.

FIG. 13B shows a variation of method 1300A in the form of method 1300B. That is, instead of acts 1330A and 1335A being performed, method 1300B substitutes act 1330B for act 1330A and substitutes act 1335B for act 1335A.

In particular, instead of successfully performing the current image alignment operation, the embodiments attempt to perform the current image alignment operation by using the first set of features and by reusing the second set of features to attempt to align the first image with the second image based on identified correspondences between the first set of features and the second set of features. Optionally, the embodiments may require that a threshold number of correspondences be identified as between the first set of features and the second set of features.

Act 1330B then involves determining that a number of correspondences identified between the first set of features and the second set of features does not meet a correspondence threshold such that the current image alignment operation failed. For instance, FIG. 10 described how a threshold 1020E can be established, where this threshold 1020E can require at least a minimum number of correspondences between features to be identified in order to perform the visual alignment 1020.

Act 1335B then includes using a different permutation of features associated with an image generated by the second camera to perform a new image alignment operation. For instance, instead of repeatedly using the features 1120B from FIG. 11A, some embodiments use a different permutation of features, such as perhaps features that were extracted from an image that was generated even prior to image 1120A. Recall, the embodiments are able to maintain a historical record of features for images. In some cases, those features can be aggregated together. In some cases, those features are separately maintained. These different collections of features are referred to as different permutations. The embodiments are able to select from a previous permutation of features in the event that a currently-used permutation fails to achieve or provide the threshold number of correspondences. The different permutation of features can be generated prior in time to the second set of features. Optionally, a threshold number of features in this different permutation of features can be determined to be duplicates of features in the first set of features. In other words, these duplicates can be beneficially used to help with the alignment process. It is desirable to identify duplicate features from the different images to enable the system to make the proper pose alignment for those images.

FIG. 13C shows a method 1300C for using a multithreaded approach to performing the disclosed operations. In particular, method 1300C can be performed by a first thread (e.g., "Thread 1") and a second thread (e.g., "Thread 2").

Acts 1340, 1345, 1350, and 1355 are performed by Thread 1. Acts 1360, 1365, 1370, and 1375 are performed by Thread 2.

Act 1340 includes accessing a first image. Act 1345 then includes identifying a first set of features from the first image. Act 1350 includes accessing a second set of features from a second image. An image alignment operation is then performed in act 1355.

Act 1360 includes accessing a third image. A third set of features are identified (e.g., act 1365) from the third image.

Act 1370 then includes accessing a fourth set of features from a fourth image. Finally, an image alignment operation is performed in act 1375.

Example Methods for Aggregating Features

FIG. 14 shows a flowchart of an example method 1400 for generating an aggregated set of features from multiple images generated by a camera. Method 1400 can also be performed by the disclosed HMDs and/or by a cloud service.

Method 1400 includes an act (act 1405) of accessing a first image generated by the camera. The first image is generated at a first time. Act 1410 includes identifying a first set of features from within the first image by performing feature extraction on the first image.

Method 1400 also includes act 1415, which is performed after act 1405 but which can optionally be performed in parallel with act 1410. Act 1415 includes accessing a second image generated by the camera. This second image is generated at a second time, which is subsequent to the first time. Act 1420 then includes identifying a second set of features from within the second image by performing feature extraction on the second image.

Method 1400 also includes act 1425, which is performed after act 1415 but which can optionally be performed in parallel with acts 1410 and/or 1420. Act 1425 includes obtaining movement data detailing a movement of the camera between the first time and the second time.

Act 1430 then includes using the movement data to reproject a pose embodied in the first image to correspond to a pose embodied in the second image. A motion model can be used to facilitate this reprojection. Stated differently, reprojecting the pose embodied in the first image to correspond to the pose embodied in the second image can involve the use of a motion model. Furthermore, the movement data can include IMU data.

Act 1435 includes aggregating the first set of features, which underwent the reprojection operation, with the second set of features. This aggregation results in the generation of an aggregated set of features. The aggregation can include making a union between the different sets of features and/or merging those features.

Act 1440 then includes caching the aggregated set of features for the camera. The aggregated features can be cached or stored on the HMD or in the cloud. In some implementations, additional sets of features identified from additional images generated by the camera can be aggregated together with the aggregated set of features. For instance, features for 1, 2, 3, 4, 5, 6, 7, 8, 9, 10 or more than 10 images can all be aggregated together. Optionally, the aggregated set of features can be compiled into a single unit vector space.

In some cases, each feature in the aggregated set of features is tagged with a corresponding timestamp of when the image was generated. Consequently, multiple different permutations of features can be included in the aggregated set of features, where each permutation is tagged with timing data.

Optionally, the method can include subsequently accessing the aggregated set of features for the camera during an image alignment operation. With this image alignment operation, an image generated by the camera is aligned with a different image generated by a different camera. The historically aggregated features can be used to help improve the alignment process, particularly for scenarios where perhaps a single image might not have a sufficient number of detectable features (e.g., such as perhaps might be the case with an isothermal scene or a low-contrast scene).

For instance, consider a scenario where the first image and the second image capture an isothermal scene or a low-contrast scene. In such a scenario, it might be the case that the number of features included in the first set of features is less than a threshold number. It might also be the case that a number of features included in the second set of features is also less than the threshold number. After aggregating the first set of features with the second set of features, however, the number of features included in the aggregated set of features can at least meet the threshold number.

In some embodiments, the first and second images can be of the same image type or can be of different image types. Optionally, the image types can include a thermal image type, a low light image type, or a visible light image type. In some cases, the resolutions of the two images can be different.

Accordingly, when performing image alignment, there are various ways to benefit from the flexibility afforded by separating image processing and feature extraction steps from the rest of the image alignment task. The process of visual alignment can include various feature extraction processes, resizing processes, denoising processes, and so on. Such processes can cause delay or latency. The embodiments are able to beneficially reduce the latency by reusing features that were previously extracted from an older image while the features for a newer image are being extracted. Optionally, some embodiments can selectively skip image processing and feature extraction for a select one or more frames in an attempt to conserve compute and power.

The image alignment can also optionally be performed using a multithreaded approached. For instance, the embodiments can dedicate a thread to each image source. That thread can perform image processing and feature extraction for the latest image from a camera source. That thread can also cache the feature extraction results. Using a multi-threaded approach allows the embodiments to optionally limit the rate of iteration for performing the visual alignment processes, including feature extraction. For instance, it may be beneficial to set a limit based on the system's available compute or power constraint/budget, certain characteristics of the camera source, or perhaps a determined importance of a particular image alignment task.

If an alignment fails or feature matching does not generate a sufficient number of matches using the latest sets of feature extraction results, the embodiments can try a different permutation of feature sets chosen from feature extraction result history. The embodiments can then retry image alignment.

The aggregation process may involve mapping feature positions from image coordinates to unit vector space or some other coordinate system that denotes real world orientation of the feature relative to image source (e.g. using IMU/gyroscope data to determine relative pose history of image source). Feature extraction result aggregation may involve feature matching between latest feature extraction results and aggregated feature extraction results to detect duplicate features and filter out the older results.

Compared to conventional image alignment workflow (where feature extraction is performed on the latest images from all image sources for every image alignment attempt), separating feature extraction and caching the feature extraction results enables the above optimization strategies. Such strategies and processes can be useful in applications (i) where latency between arrival of an image and alignment result output is desirably set to a minimum, (ii) when frequency of alignment result output is important, (iii) on systems where image sources are not synchronized, (iv) on systems with limited compute/power budget, (v) when image alignment is being performed on feature-poor scenes, and (vi) on systems where image sources are moving through complex scenes with objects that can temporarily obstruct the view.

Beneficially, each feature extraction result can get used in multiple alignment attempts, thereby increasing the likelihood that a sufficiently large number of accurate feature matches will be found to perform alignment. Another benefit is that images may be updated slowly and in an unsynchronized way. Thus, the embodiments do not need to wait for new images from each source pair before performing alignment. The embodiments also beneficially allow a resource constrained system to update alignment results more frequently while expending same compute/power on the image processing and feature extraction steps. If the alignment task is blocked until signaled by receipt of an image from a particular source, the disclosed approaches can help reduce latency between receiving an image from that source and generating alignment output because feature extraction for other image sources have already been performed.

Using the multithreaded asynchronous feature extraction approach also provides various benefits. For instance, if the rate of iteration in each thread is not constrained, this scheme can maximize the frequency at which image alignment results are updated. On a resource constrained system, a fine-grained tradeoff can be made between compute/power usage and alignment frequency by rate-limiting feature extraction and alignment performed on each thread depending on the image source associated with the thread.

There are also various benefits of keeping a history of feature extraction results. For instance, feature extraction may not output the same set of features even if image sources are stationary and the scene is static. Sensor noise, air density gradient, and other factors may change the location of features found and values in feature descriptors generated. Having a history of feature extraction results (so that feature matching can be performed with different permutations of feature sets) increases the likelihood of finding a good set of feature matches to perform alignment. If image sources are moving or the scene is dynamic (e.g., foliage moving in wind thereby obscuring the view), different set of features may be obscured from the view of each image source at any given time. This may decrease the quality of alignment or decrease the rate at which successful alignment results are generated by a conventional alignment approach. By keeping a history of feature extraction results and by attempting alignment over different permutations of those feature sets, the embodiments beneficially provide more frequent and better alignment results. In situations where data from the IMU or similar sensors becomes unreliable (e.g., while recovering from sudden impact), performing image alignment on feature set histories may be useful in obtaining an estimation of equipment motion.

Furthermore, conventional feature-based image alignment approaches can have trouble finding a sufficiently large number of accurate feature matches to perform alignment when presented with feature-poor scenes (e.g., foggy environment, dark environment, etc.). Aggregating feature extraction history of an image source into a single coordinate space (e.g., a unit vector space) may enable the use of different features found in past images from that source and may allow better feature matching output and better alignment. Accordingly, the disclosed principles provide numerous benefits and technical achievements.

Example Computer/Computer Systems

Figure 15:
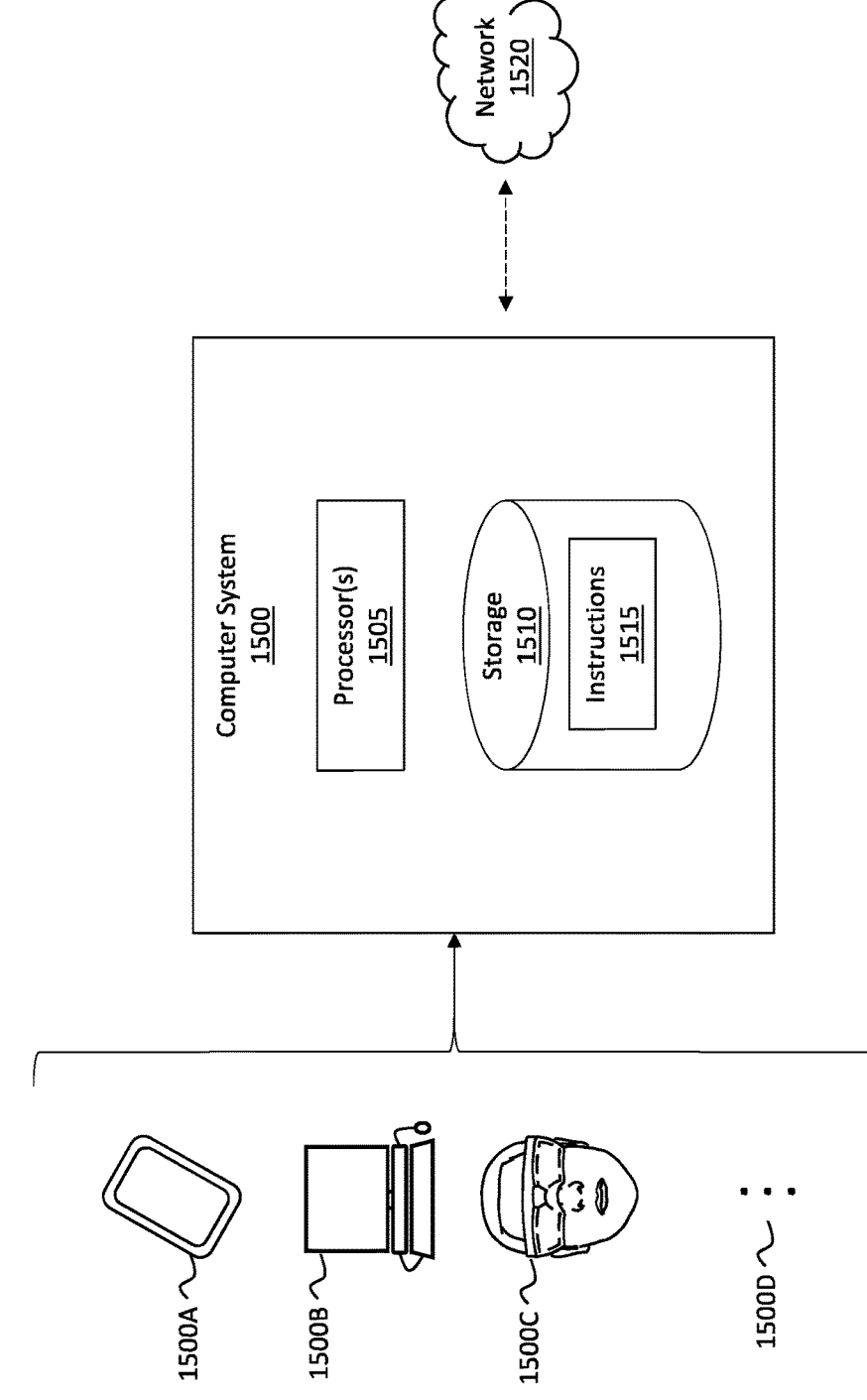
FIG. 15 illustrates an example computer system that can be configured to perform any of the disclosed operations.

Attention will now be directed to FIG. 15 which illustrates an example computer system 1500 that may include and/or be used to perform any of the operations described herein, such as the disclosed methods. Computer system 1500 may take various different forms. For example, computer system 1500 may be embodied as a tablet 1500A, a desktop or a laptop 1500B, a wearable device 1500C (e.g., a HMD), a mobile device, or any other standalone device, as represented by the ellipsis 1500D. Computer system 1500 may also be a distributed system that includes one or more connected computing components/devices that are in communication with computer system 1500. Computer system 1500 can be a system operating in a cloud environment.

In its most basic configuration, computer system 1500 includes various different components. FIG. 15 shows that computer system 1500 includes one or more processor(s) 1505 (aka a "hardware processing unit") and storage 1510.

Regarding the processor(s) 1505, it will be appreciated that the functionality described herein can be performed, at least in part, by one or more hardware logic components (e.g., the processor(s) 1505). For example, and without limitation, illustrative types of hardware logic components/ processors that can be used include Field-Programmable Gate Arrays ("FPGA"), Program-Specific or Application-Specific Integrated Circuits ("ASIC"), Program-Specific Standard Products ("AS SP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1500. The different components, modules, engines, and services described herein may be implemented as objects or processors that execute on computer system 1500 (e.g. as separate threads).

Storage 1510 may be physical system memory, which may be volatile, non-volatile, or some combination of the two. The term "memory" may also be used herein to refer to non-volatile mass storage such as physical storage media. If computer system 1500 is distributed, the processing, memory, and/or storage capability may be distributed as well.

Storage 1510 is shown as including executable instructions 1515. The executable instructions 1515 represent instructions that are executable by the processor(s) 1505 of computer system 1500 to perform the disclosed operations, such as those described in the various methods.

The disclosed embodiments may comprise or utilize a special-purpose or general-purpose computer including computer hardware, such as, for example, one or more processors (such as processor(s) 1505) and system memory (such as storage 1510), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1500 may also be connected (via a wired or wireless connection) to external sensors (e.g., one or more remote cameras) or devices via a network 1520. For example, computer system 1500 can communicate with any number devices or cloud services to obtain or process data. In some cases, network 1520 may itself be a cloud network. Furthermore, computer system 1500 may also be connected through one or more wired or wireless networks to remote/separate computer systems(s) that are configured to perform any of the processing described with regard to computer system 1500.

A "network," like network 1520, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1500 will include one or more communication channels that are used to communicate with the network 1520. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating an aggregated set of features from multiple images generated by a camera, where the aggregated set of features includes multiple permutations of a feature, with each permutation of the feature being tagged with corresponding timing data, said method comprising:

accessing a first image generated by the camera, the first image being generated at a first time;

identifying a first set of features from within the first image by performing feature extraction on the first image;

accessing a second image generated by the camera, the second image being generated at a second time, which is subsequent to the first time;

identifying a second set of features from within the second image by performing feature extraction on the second image;

obtaining movement data detailing a movement of the camera between the first time and the second time;

subsequent to identifying the first set of features and the second set of features, using the movement data to reproject a pose embodied in the first image to correspond to a pose embodied in the second image;

aggregating the first set of features, which underwent said reprojection, with the second set of features to generate the aggregated set of features, wherein:

each feature in the aggregated set of features is tagged with corresponding timing data reflecting when a corresponding image for said each feature was generated, and the aggregated set of features comprises multiple different permutations for each of at least some of the features, such that each permutation is also associated with corresponding timing data;

caching the aggregated set of features for the camera, resulting in a history of feature extraction results being accessible for an image alignment operation; and performing the image alignment operation by accessing the history of feature extraction results, wherein the image alignment operation includes performing an alignment using different permutations of a common feature that is represented in different images, where the different permutations have different timing data.

2. The method of claim 1, wherein the movement data includes inertial measurement unit (IMU) data.

3. The method of claim 1, wherein reprojecting the pose embodied in the first image to correspond to the pose embodied in the second image involves use of a motion model.

4. The method of claim 1, wherein the first image and the second image capture a low-contrast scene, and wherein a number of features included in the first set of features is less than a threshold number.

5. The method of claim 4, wherein, after aggregating the first set of features with the second set of features, a number of features included in the aggregated set of features at least meets the threshold number.

6. The method of claim 1, wherein a number of features included in the first set of features is less than a threshold number, wherein a number of features included in the second set of features is also less than the threshold number, and wherein a number of features included in the aggregated set of features at least meets the threshold number.

7. The method of claim 1, wherein a frame rate of the camera is between 30 frames per second (FPS) and 120 FPS.

8. The method of claim 1, wherein the first and second images are of a type comprising: a thermal image type, a low light image type, or a visible light image type.

9. A computer system that generates an aggregated set of features from multiple images generated by a camera, where the aggregated set of features includes multiple permutations of a feature, with each permutation of the feature being tagged with corresponding timing data, said computer system comprising:

at least one processor; and at least one hardware storage device that stores instructions that are executable by the at least one processor to cause the computer system to:

access a first image generated by the camera, the first image being generated at a first time;

identify a first set of features from within the first image by performing feature extraction on the first image;

access a second image generated by the camera, the second image being generated at a second time, which is subsequent to the first time;

identify a second set of features from within the second image by performing feature extraction on the second image;

obtain movement data detailing a movement of the camera between the first time and the second time;

subsequent to identifying the first set of features and the second set of features, use the movement data to reproject a pose embodied in the first image to correspond to a pose embodied in the second image;

aggregate the first set of features, which underwent said reprojection, with the second set of features to generate the aggregated set of features, wherein:

each feature in the aggregated set of features is tagged with corresponding timing data reflecting when a corresponding image for said each feature was generated, and the aggregated set of features comprises multiple different permutations for each of at least some of the features, such that each permutation is also associated with corresponding timing data;

cache the aggregated set of features for the camera, resulting in a history of feature extraction results being accessible for an image alignment operation; and perform the image alignment operation by accessing the history of feature extraction results, wherein the image alignment operation includes performing an alignment using different permutations of a common feature that is represented in different images, where the different permutations have different timing data.

10. The computer system of claim 9, wherein additional sets of features identified from additional images generated by the camera are aggregated with the aggregated set of features.

11. The computer system of claim 9, wherein the aggregated set of features are compiled into a single unit vector space.

12. The computer system of claim 9, wherein the camera is one of a low light camera, a thermal camera, or a visible light camera.

13. The computer system of claim 9, wherein a frame rate of the camera is between 30 frames per second (FPS) and 60 FPS.

14. The computer system of claim 9, wherein the camera is integrated with the computer system.

15. The computer system of claim 9, wherein the camera is peripheral relative to the computer system.

16. The computer system of claim 9, wherein the computer system is a wearable mixed-reality (MR) device.

17. A method for generating an aggregated set of features from multiple images generated by a camera, where the aggregated set of features includes multiple permutations of a feature, with each permutation of the feature being tagged with corresponding timing data, said method comprising:

accessing a first image generated by the camera, the first image being generated at a first time;

identifying a first set of features from within the first image by performing feature extraction on the first image;

accessing a second image generated by the camera, the second image being generated at a second time, which is subsequent to the first time;

identifying a second set of features from within the second image by performing feature extraction on the second image;

obtaining movement data detailing a movement of the camera between the first time and the second time;

subsequent to identifying the first set of features and the second set of features, using the movement data to reproject a pose embodied in the first image to correspond to a pose embodied in the second image;

aggregating the first set of features, which underwent said reprojection, with the second set of features to generate the aggregated set of features, wherein:

each feature in the aggregated set of features is tagged with corresponding timing data reflecting when a corresponding image for said each feature was generated, and the aggregated set of features comprises multiple different permutations for each of at least some of the features, such that each permutation is also associated with corresponding timing data;

caching the aggregated set of features for the camera, resulting in a history of feature extraction results being accessible for an image alignment operation; and accessing the history of feature extraction results during the image alignment operation in which an image generated by the camera is aligned with a different image generated by a different camera, wherein the image alignment operation includes performing said aligning using different permutations of a common feature that is represented in both said image and said different image, where the different permutations have different timing data.

18. The method of claim 17, wherein a number of features included in the first set of features is less than a threshold number, wherein a number of features included in the second set of features is also less than the threshold number, and wherein a number of features included in the aggregated set of features at least meets the threshold number.

19. The method of claim 17, wherein the movement data includes inertial measurement unit (IMU) data.

* * * * *